US012223474B2

(12) United States Patent
Waller et al.

(10) Patent No.: US 12,223,474 B2
(45) Date of Patent: Feb. 11, 2025

(54) SYSTEM AND METHOD FOR PROVIDING A GROUP PAYMENT VEHICLE

(71) Applicant: OneCard LLC, Dallas, TX (US)

(72) Inventors: Christian Waller, Dallas, TX (US); Jake Johnson, Dallas, TX (US); Bradan Mitchell, Dallas, TX (US)

(73) Assignee: OneCard LLC, Dallas, TX (US)

( * ) Notice: Subject to any disclaimer, the term of this patent is extended or adjusted under 35 U.S.C. 154(b) by 0 days.

(21) Appl. No.: 18/586,395

(22) Filed: Feb. 23, 2024

(65) Prior Publication Data

US 2024/0338666 A1 Oct. 10, 2024

Related U.S. Application Data

(60) Provisional application No. 63/457,356, filed on Apr. 5, 2023.

(51) Int. Cl.
| | |
|---|---|
| *G06Q 30/00* | (2023.01) |
| *G06Q 20/06* | (2012.01) |
| *G06Q 20/24* | (2012.01) |
| *G06Q 20/26* | (2012.01) |
| *G06Q 20/40* | (2012.01) |
| *G06Q 20/42* | (2012.01) |

(52) U.S. Cl.
CPC ............ *G06Q 20/06* (2013.01); *G06Q 20/24* (2013.01); *G06Q 20/26* (2013.01); *G06Q 20/4015* (2020.05); *G06Q 20/42* (2013.01)

(58) Field of Classification Search
CPC .................................................. G06Q 20/06
USPC ............ 705/44, 1.1, 34, 30, 26.1, 40, 26.86; 709/204; 220/277
See application file for complete search history.

(56) References Cited

U.S. PATENT DOCUMENTS

| | | |
|---|---|---|
| 9,123,038 B2 | 9/2015 | Cozens et al. |
| 9,355,394 B2 | 5/2016 | Gupta |

(Continued)

FOREIGN PATENT DOCUMENTS

| | | |
|---|---|---|
| AU | 2018220069 A1 | 3/2019 |
| CN | 109615350 A | 4/2019 |

(Continued)

OTHER PUBLICATIONS

ProQuestDialogNPL Search History.*
International Search Report and Written Opinion for PCT/US2024/023091 dated Aug. 26, 2024, 16 pages.

*Primary Examiner* — John H. Holly
(74) *Attorney, Agent, or Firm* — Foley & Lardner LLP

(57) ABSTRACT

A group payment vehicle and process for establishing and utilizing the group payment vehicle may be utilized to make proxy payments for group members and associate payment mechanisms with the group payment vehicle. The group payment vehicle may be virtual or physical and may be time limited (or have another payment limitation). The group payment vehicle may be a debit-type or credit-type as established by a creator of the group payment vehicle. A system may be configured to enable the creator to invite potential group participants to participate with the group payment vehicle that functions as a single payment mechanism to vendors for an event. The system may limit the group payment vehicle to be time limited, geolocation limited, and/or merchant limited to limit potential financial exposure and fraud.

25 Claims, 21 Drawing Sheets

(56) References Cited

U.S. PATENT DOCUMENTS

| | | |
|---|---|---|
| 9,710,801 B2 | 7/2017 | Aadi et al. |
| 9,721,314 B2 | 8/2017 | Rose |
| 9,773,237 B2 | 9/2017 | Kumar et al. |
| 9,875,469 B1 | 1/2018 | Chin et al. |
| 9,928,489 B2 | 3/2018 | Ohnishi et al. |
| 9,934,505 B2 | 4/2018 | Atagun et al. |
| 10,002,397 B2 | 6/2018 | Rose |
| 10,185,959 B2 | 1/2019 | Atagun et al. |
| 10,242,351 B1 | 3/2019 | Wilson et al. |
| 10,318,914 B1 | 6/2019 | Arora et al. |
| 10,410,184 B2 | 9/2019 | Green et al. |
| 10,410,188 B2 | 9/2019 | James et al. |
| 10,614,440 B2 | 4/2020 | Benkreira et al. |
| 10,621,563 B1 | 4/2020 | Spindel et al. |
| 10,902,401 B2 | 1/2021 | Wetzel et al. |
| 10,915,881 B2 | 2/2021 | Kumar et al. |
| 10,956,894 B2 | 3/2021 | O'Toole et al. |
| 10,963,847 B2 | 3/2021 | Green et al. |
| 11,004,055 B2 | 5/2021 | Cheek et al. |
| 11,023,869 B1 | 6/2021 | Kumar |
| 11,170,419 B1 | 11/2021 | Gekhter |
| 11,270,286 B2 | 3/2022 | Wetzel et al. |
| 11,315,098 B2 | 4/2022 | Bluestone et al. |
| 11,410,139 B1 | 8/2022 | Spindel et al. |
| 11,538,012 B2 | 12/2022 | Unnerstall et al. |
| 11,551,196 B2 | 1/2023 | Benkreira et al. |
| 11,676,129 B2 | 6/2023 | O'Toole et al. |
| 11,710,115 B1 | 7/2023 | Kumar et al. |
| 2009/0055276 A1 | 2/2009 | Dunsmore et al. |
| 2010/0121745 A1* | 5/2010 | Teckchandani ........ G06Q 40/12 705/40 |
| 2012/0143753 A1* | 6/2012 | Gonzalez ............... G06Q 20/12 705/41 |
| 2012/0150729 A1 | 6/2012 | Isaacson et al. |
| 2012/0173396 A1 | 7/2012 | Melby et al. |
| 2014/0344092 A1 | 11/2014 | Clibanoff |
| 2016/0071139 A1 | 3/2016 | Esch |
| 2017/0053259 A1 | 2/2017 | Cavagnaro |
| 2019/0073644 A1 | 3/2019 | Isaacson et al. |
| 2020/0387884 A1* | 12/2020 | Bluestone ............ G06Q 20/227 |
| 2022/0138755 A1 | 5/2022 | Aument |
| 2022/0253822 A1 | 8/2022 | Bluestone et al. |
| 2023/0061296 A1 | 3/2023 | Bantanur et al. |

FOREIGN PATENT DOCUMENTS

| | | |
|---|---|---|
| KR | 20110101262 A | 9/2011 |
| KR | 101744315 B1 | 6/2017 |
| KR | 101943563 B1 | 1/2019 |
| WO | WO-2023/039002 A1 | 3/2023 |

* cited by examiner

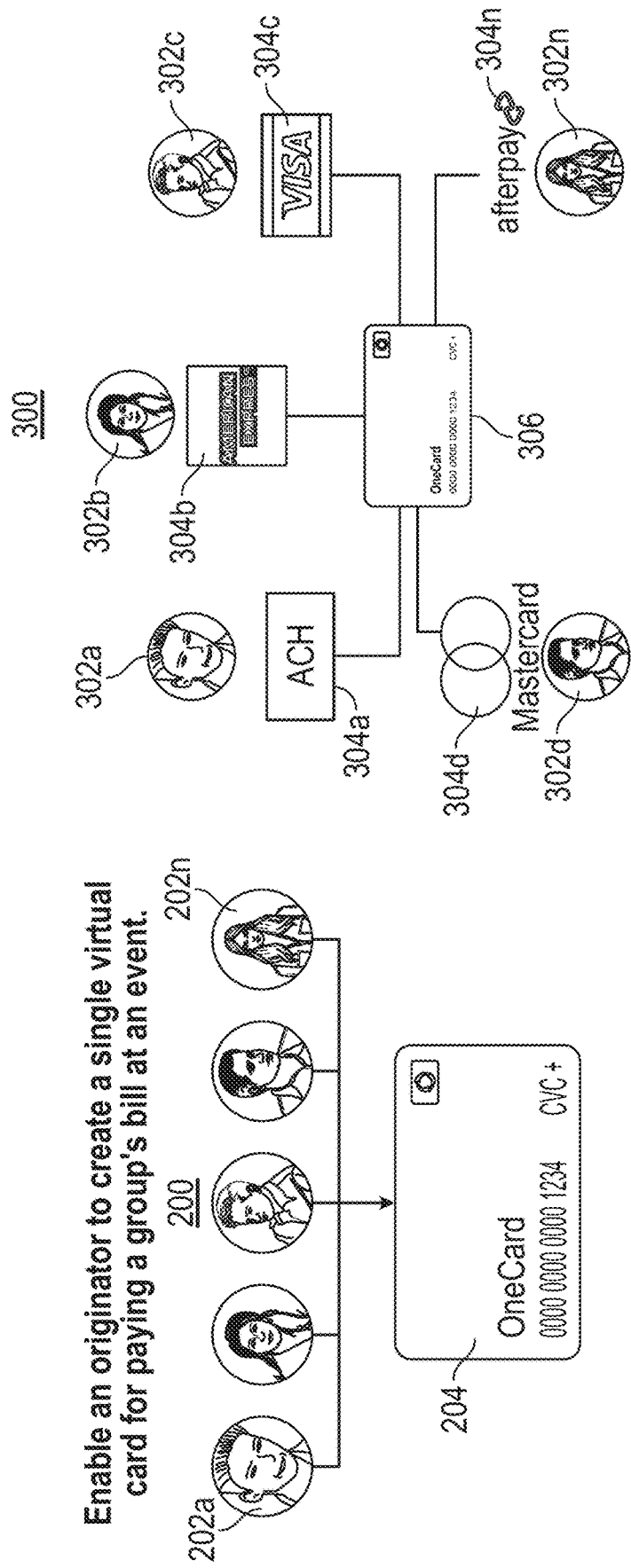

Card Amount

Choose Card Type - Funded Card

Name Card

ADD USERS

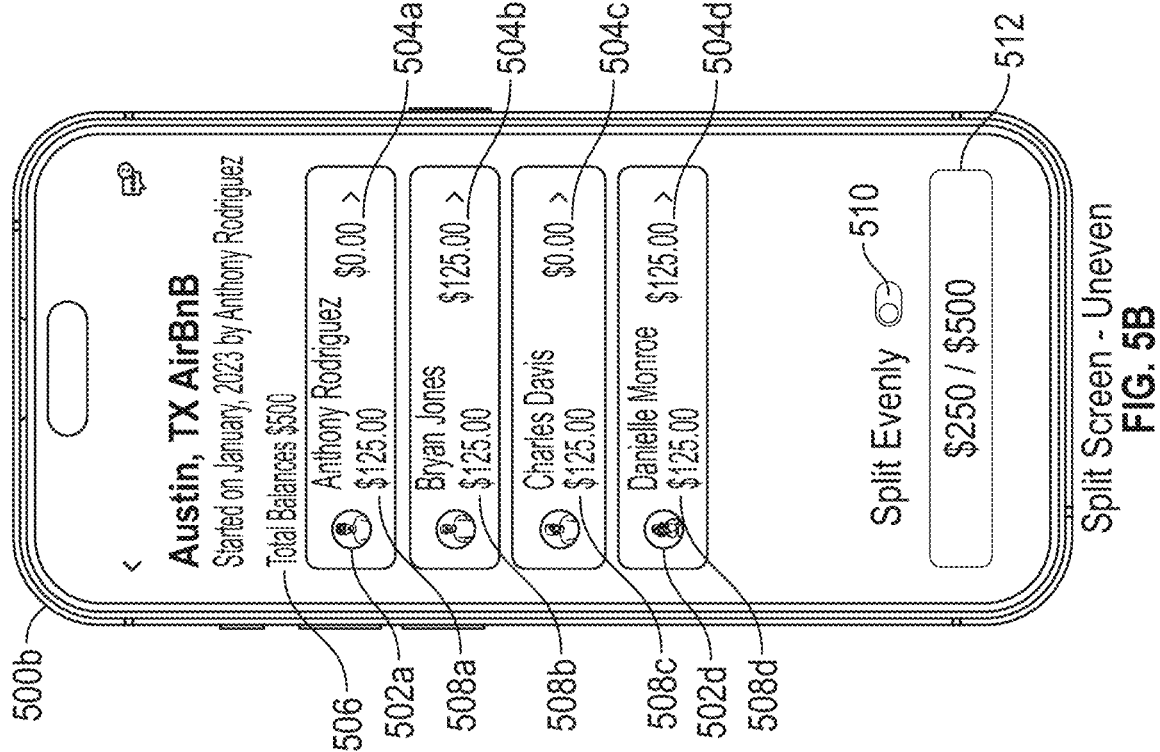
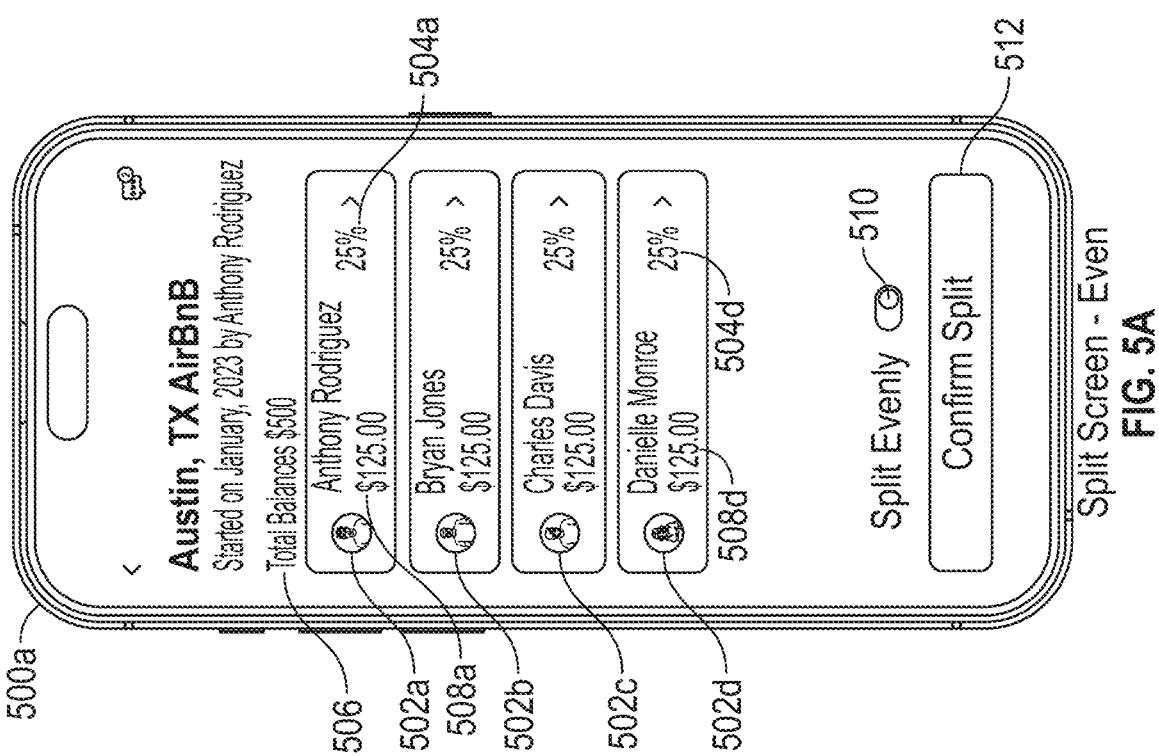

Confirm Details

Split Screen - User Update

Card Members - Even Percentage (4)

Card Members - Even Percentage (5)

Paying Different Amounts

OPTIONS - ADMIN VIEW

FULLY FUNDED CARD - ADMIN VIEW

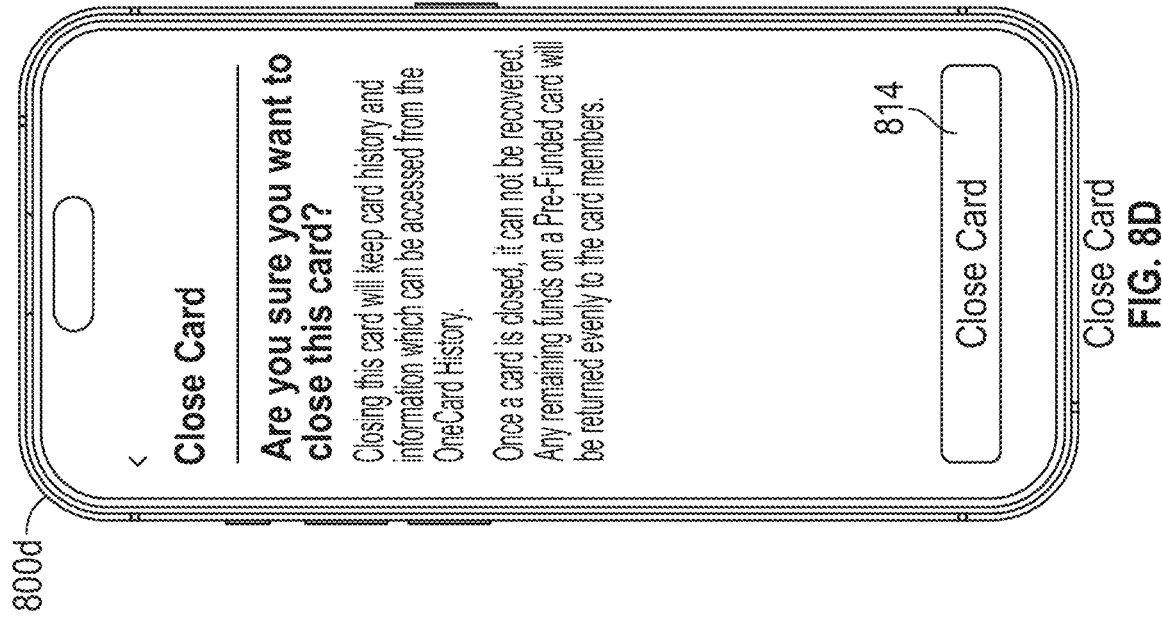
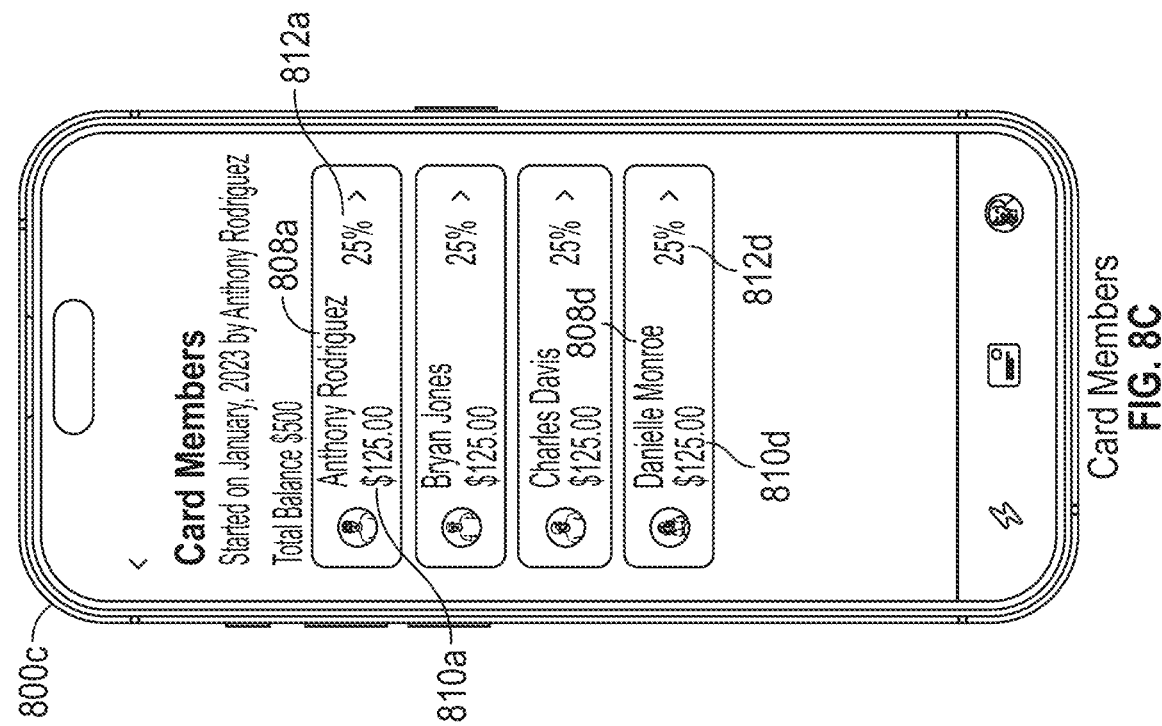
FIG. 8C Card Members
FIG. 8D Close Card

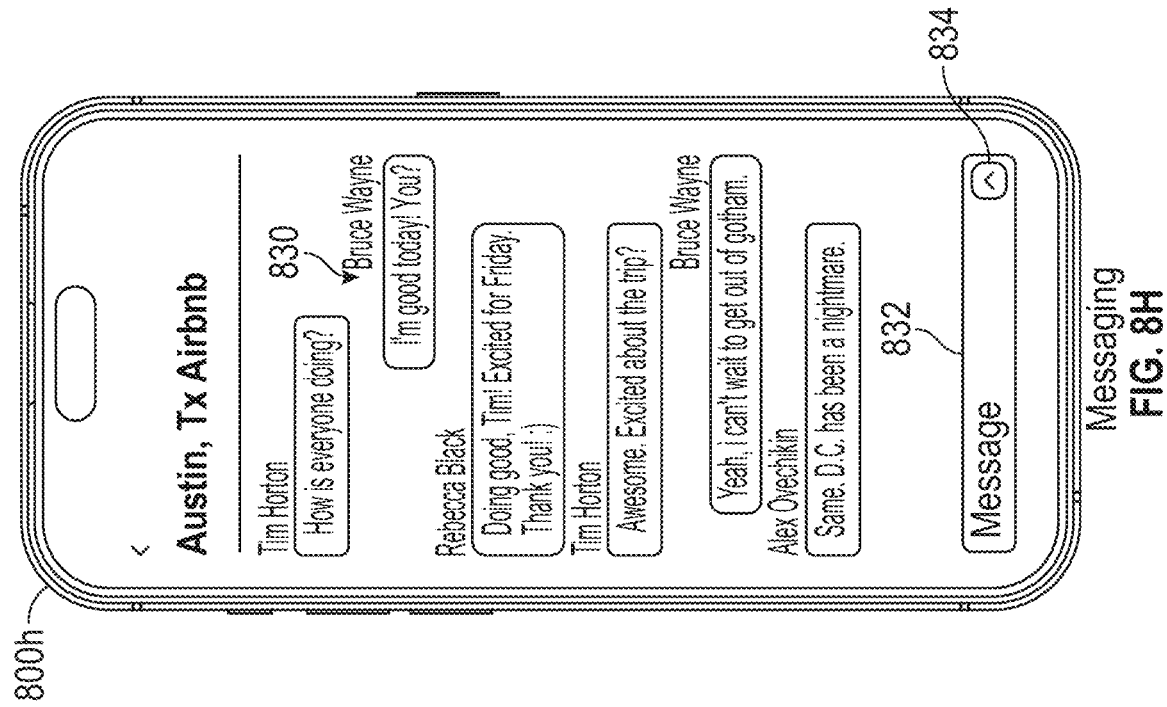
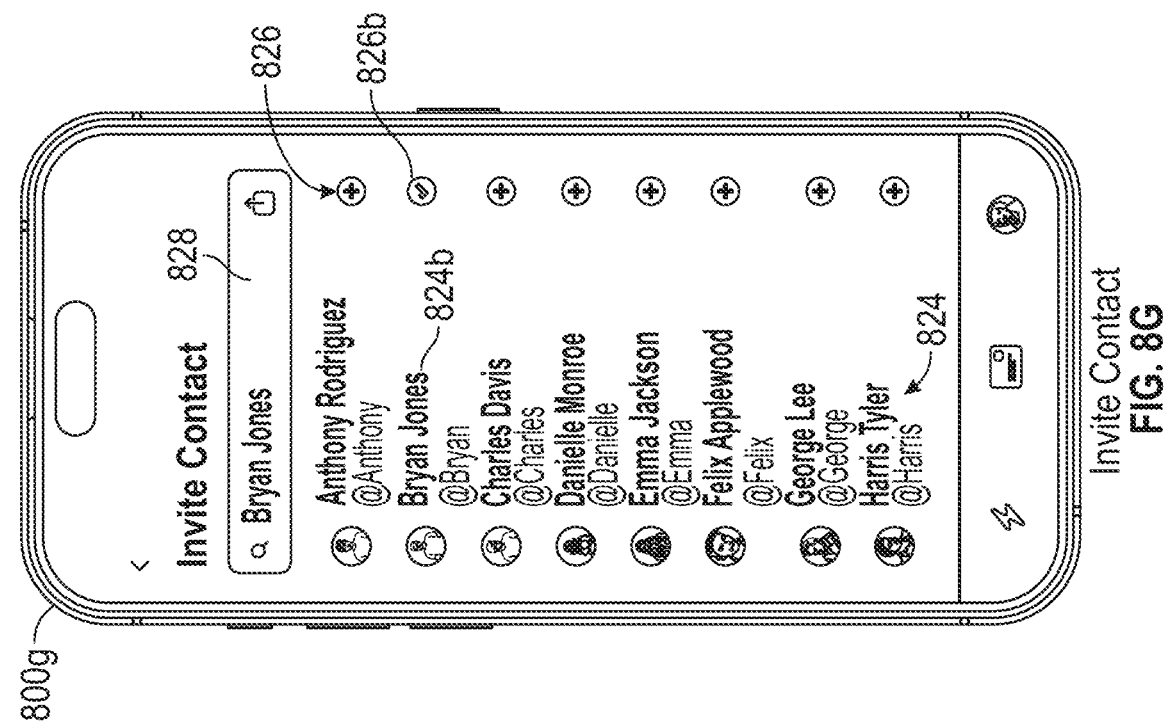
FIG. 8G
FIG. 8H

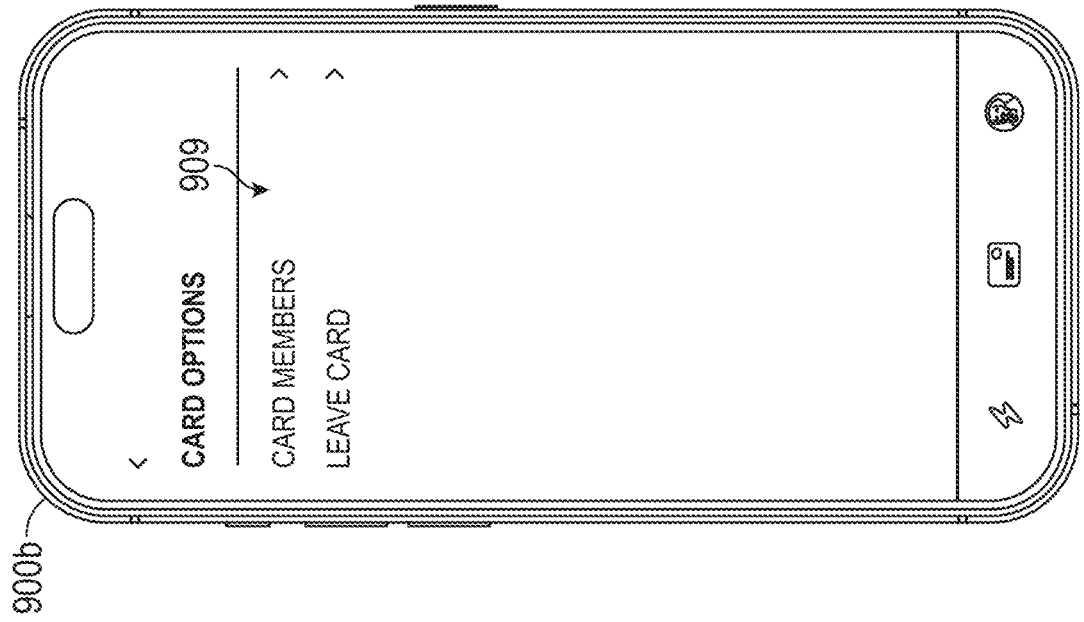
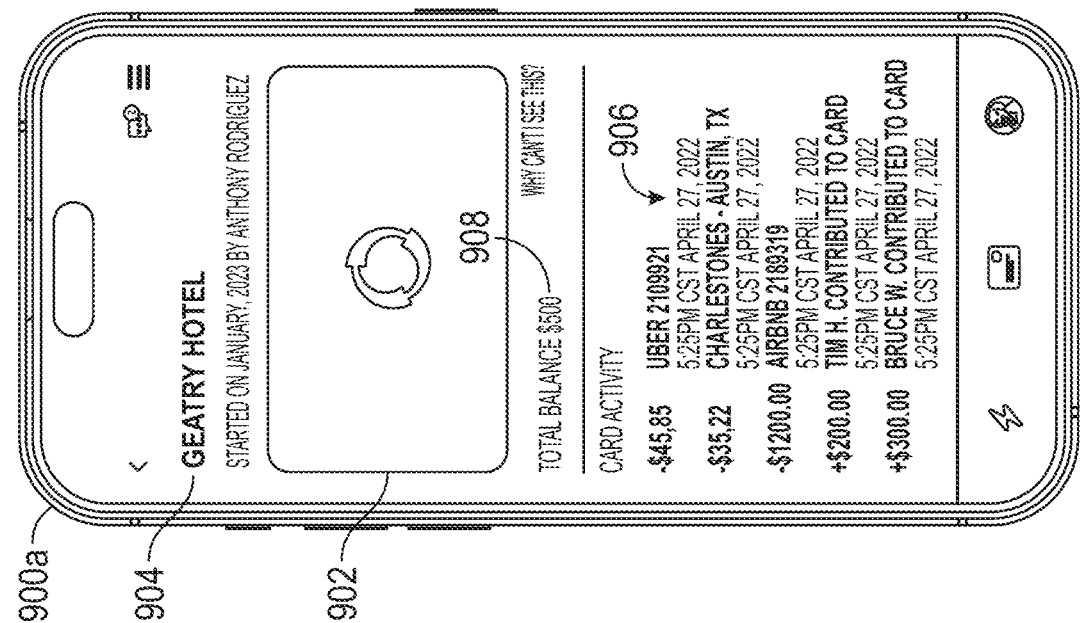

Leave Card

Card Members

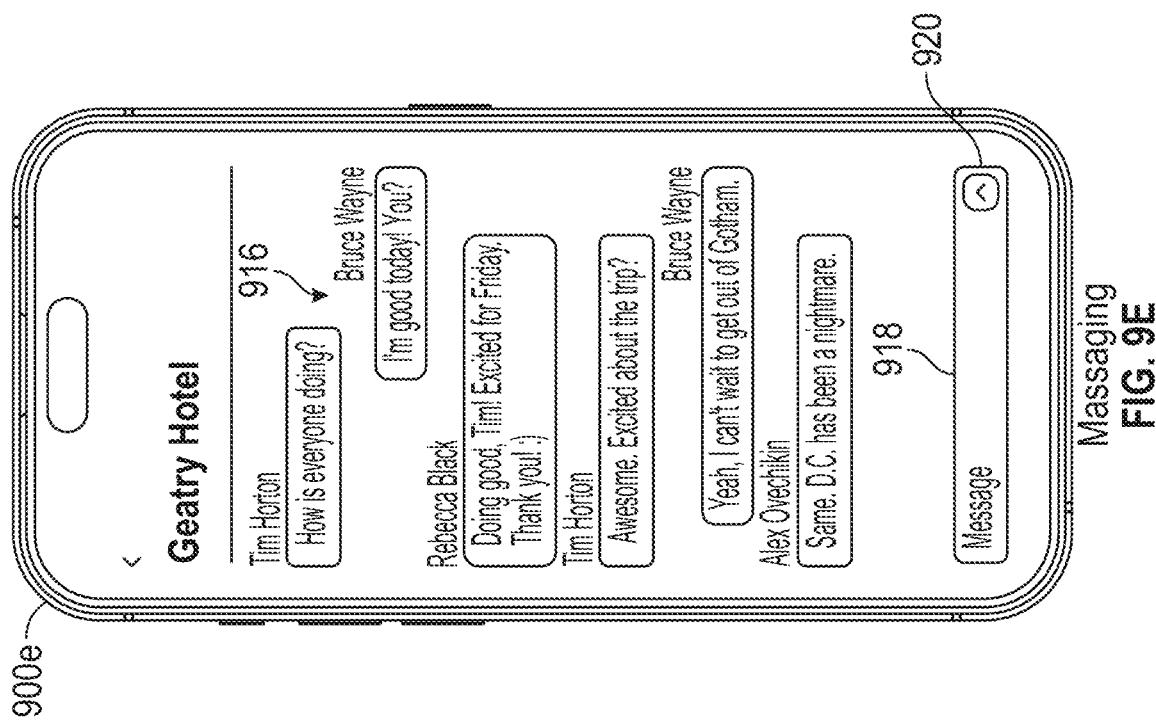

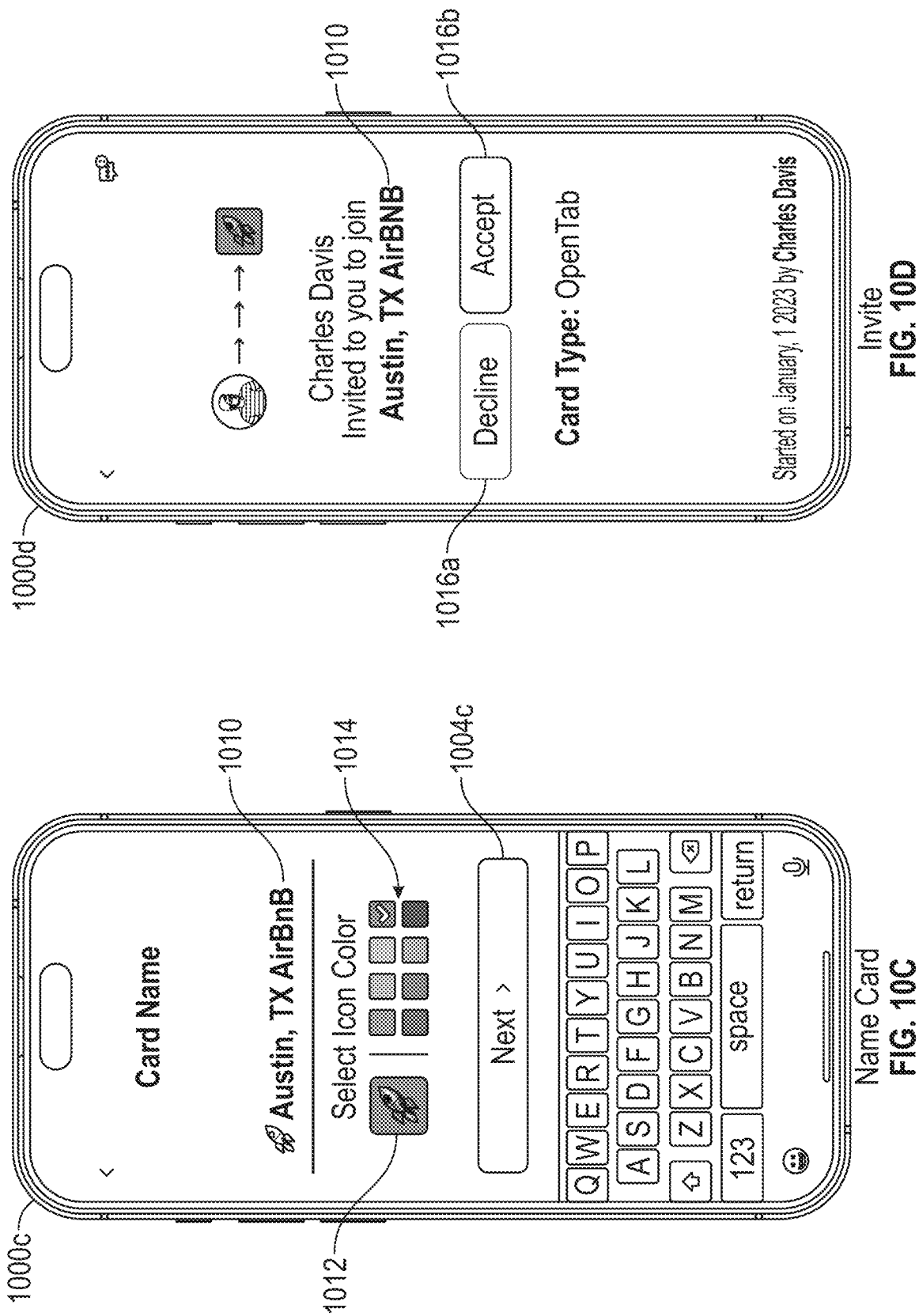

SYSTEM AND METHOD FOR PROVIDING A GROUP PAYMENT VEHICLE

RELATED APPLICATIONS

This application claims priority to U.S. Provisional Patent Application having Ser. No. 63/457,356 filed on Apr. 5, 2023; the contents of which are hereby incorporated by reference in their entirety.

BACKGROUND OF THE INVENTION

Society has long ago advanced from using cash as a main form of currency. Payment cards, such as credit cards, and other payment systems, such as digital wallets and super-apps, for use by consumers to pay merchants and for consumers to pay one another directly have become pervasive throughout society. Mobile apps, in particular, have revolutionized how individuals pay one another when purchasing goods and services or even participate in sharing costs for various events, such as dinners. One problem that exists for individuals is ultimately collecting payment from one another. For example, if people are to share the cost of dinner (or larger expenditures), despite all good intentions, collecting from friends and/or family does not always go as planned. Having to collect money from friends and family can often lead to relationship issues. Other types of money-sharing and collecting situations happen all the time, and in each case, a barrier can become an issue because one person has to front the money and then collect from other participants.

In many cases, rather than one person having to front the money for a group, if each of the group members are at an event (e.g., merchant, such as a restaurant) at which each person can make payment him or herself, each member can provide financial payment, such as a credit card, debit card, or otherwise, to the merchant and then an employee of the merchant can split the invoice amongst each of the cards. Splitting the invoice takes labor, which can be inefficient and costly for the merchant. For ease of explanation, if a merchant, such as a restaurant, collects payment cards from each of the members at a meal, the merchant may split the invoice evenly or based on each individual payer. As well known, payment cards each have a certain percentage that is collected by the payment card companies, payment processors, and so on. In some cases, the payment cards have low percentages, such as 2% or 3%, but in other cases, payment cards have 5% payment charges, and these percentages are taken directly from payments being made to the restaurant. As a result, while payment cards are efficient for merchants, the cost of supporting payment cards can be high especially when one or more payers use high percentage payment cards. For at least these reasons, both individuals and merchants have a need for a new payment vehicle for groups that will make collecting easier and potentially reduce the labor and fees for merchants to be paid to the payment card companies.

SUMMARY OF THE INVENTION

To overcome the problems of individuals having to pay and collect from one another for group events or merchants losing productivity due to having to split invoices and losing percentages when accepting payment by payment cards, a group payment vehicle that is virtual and may be time limited (or have another payment limitation) that enables a group of individuals to participate may be provided. The group payment vehicle may be a debit-type or credit-type as established by a creator of the group payment vehicle. A system may be configured to enable the creator to invite potential group participants to participate with the group payment vehicle that functions as a single payment mechanism to vendors for an event. The system may limit the group payment vehicle to be time limited, geography-use limited, and/or merchant limited to limit potential financial exposure and fraud. To support the functionality of the group payment vehicle, the system may enable group members to establish payment mechanisms with the group payment vehicle by using data objects that support such functionality, thereby automatically controlling collections from group members, communications to group members, control functionality of the group payment vehicle by the creator, payments to vendors using the group payment vehicle, and limit fraud by the creator or others of the group payment vehicle.

One embodiment of a computer-implemented method may include enabling, via a first user interface, a group payment vehicle creator to self-establish a group payment vehicle configured to make a proxy payment to at least one merchant. The first user interface may be established for the group payment vehicle creator to (i) establish a payment mechanism with the group payment vehicle for him or herself, and (ii) selectably invite a plurality of potential group participants at respective network addresses. An electronic invitation may be communicated to each of the invited potential group members to participate in an event using the respective network addresses, where the electronic invitation may include information associated with the group payment vehicle. In response to a potential group member accepting the electronic invitation via a second user interface, the accepted group member may be enabled to establish a respective payment mechanism with the group payment vehicle via the second user interface. A data object inclusive of information associated with each of the accepted group members who established respective payment mechanisms with the group payment vehicle may be formed. In an embodiment, the data object may include the network address of the respective accepted group members and coordinates of the respective payment mechanisms, thereby connecting the respective payment mechanisms to the group payment vehicle. The group payment vehicle creator may be notified that the group payment vehicle is established and available for usage in paying the at least one merchant.

BRIEF DESCRIPTION OF THE DRAWINGS

Illustrative embodiments of the present invention are described in detail below with reference to the attached drawing figures, which are incorporated by reference herein and wherein:

FIG. 2 is an illustration of an illustrative group of members who are participating in an event using a group payment vehicle (e.g., virtual payment card in the form of a debit or credit type group payment vehicle);

FIG. 3 is an illustration of an illustrative conceptual arrangement of payment mechanisms (e.g., credit and debit cards) associated with respective group members who have accepted an invitation to participate in an event in which a group payment vehicle is to be utilized;

FIGS. 5A-5D are illustrative screen shots of user interfaces that enables accepted group members, including the GPV creator, to view participation in an event and see other group members and participate amount (e.g., percentage, fixed amount, or otherwise);

FIGS. 8A-8H are illustrations of illustrative user interfaces of a GPV system that provide a GPV creator with an administration view and controls thereof are shown;

FIGS. 9A-9E are illustrations of illustrative user interfaces of a GPV system that supports a debit type GPV and provide a GPV creator, potential group participants, and/or accepted group members to view other participants and perform various functions;

FIGS. 10A-10D are illustrations of illustrative user interfaces of a GPV system that supports a credit type GPV ("Open Card") and provide a GPV creator with the ability to establish and manage a GPV that enables accepted group members to attend an event and make payments after an event occurs;

DETAILED DESCRIPTION OF THE DRAWINGS

Figure 1:
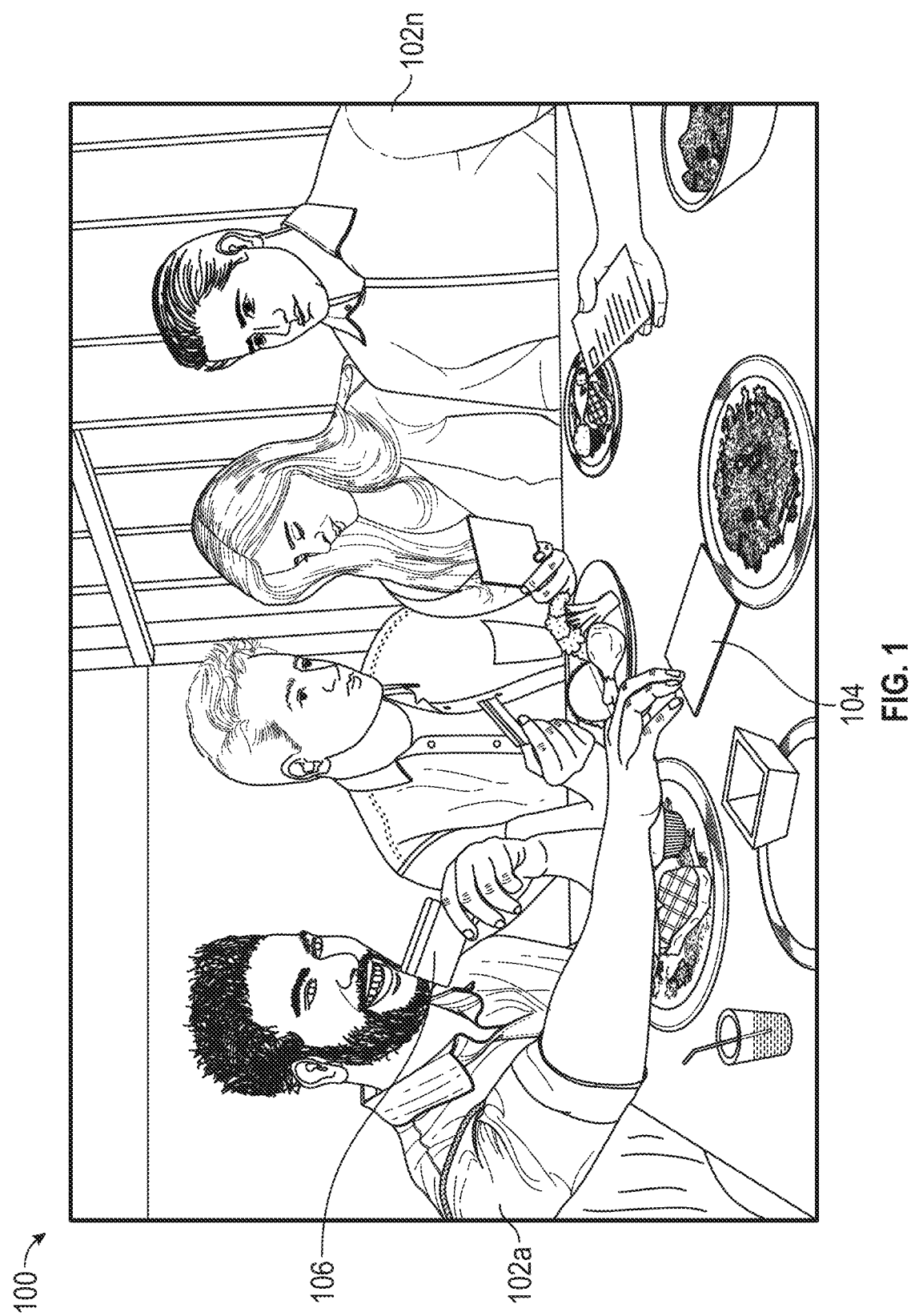
FIG. 1 is an image of an illustrative group of people at an event, in this case dinner at a restaurant.

With regard to FIG. 1, an image of an illustrative event 100 at which a group of people 102a-102n (collectively 102), in this case dinner at a restaurant, is shown. A check or invoice 104 for the dinner may be provided to the group 102 for payment. In an embodiment, a member 102a of the group 102 may have created or established a group payment vehicle ("GPV") 106 prior to the event to enable a single card, either a virtual payment card or a physical payment card, that the creator 102a may use to pay the vendor. The member 102a who created the group payment vehicle 106 may be considered a group payment vehicle (GPV) creator ("creator"). The group payment vehicle 106 may be a debit or credit type of payment vehicle, as described further herein. A debit type of group payment vehicle may be considered a funded payment vehicle in that prior to the event 100, accepted group members 102b-102n (i.e., potential group participants who accept to join the group 102) pay into the GPV 106 such that the GPV 106 is fully funded by each of the group members 102, which includes the group payment vehicle creator 102a, so that the GPV creator 102a may use the GPV 106 to settle payment with vendor(s) during or after the event 100 without the GPV creator 102a having to "chase down" the other group members 102b-102n after the event 100.

With regard to FIG. 2, an illustration of an illustrative event 200 in which a group of members 202a-202n (collectively 202) who are participating in the event 200 using a group payment vehicle 204 (e.g., virtual payment card in the form of a debit or credit type group payment vehicle) is shown. The group payment vehicle 204 shown is "financially connected" to each of the group members 202 in that a system is configured to have access to a payment mechanism (e.g., bank account, credit card, debit card, prepaid card, etc.), as further described herein. If the group payment vehicle 204 is a debit type, then the GPV 204 is funded prior to an event (e.g., prior to a funding deadline) by each of the accepted group members 202 (i.e., potential group members who accepted an invitation by a GPV creator 202a). If the group payment vehicle 204 is a credit type, then the GPV 204 is usable prior to and during the event and is reimbursed by the accepted group members after the event 200. The GPV facilitator may establish a system executing processes that facilitate each of the debit and credit GPVs. In addition, potential financial exposure and fraud mechanisms may be established and utilized to provide security to the GPV creator 202a and group members 202.

With regard to FIG. 3, an illustration of an illustrative conceptual arrangement 300 group members 302a-302n (collectively 302) of payment mechanisms 304a-304n (collectively 304) (e.g., credit and debit cards) associated with the respective group members 302 who have accepted an invitation to participate in an event in which a group payment vehicle 306 is to be utilized is shown. As shown, the payment mechanisms 304 may include ACH (e.g., bank accounts), credit cards, debit cards, prepaid cards, or any other type of physical or virtual payment mechanism utilized by an accepted group member to make payments to the GPV 306, which is shown at the center of the payment mechanisms 304.

With regard to FIGS. 4A-4D, illustrative screen shots of user interfaces 400a-400d (collectively 400) displayed on electronic devices that enable a GPV creator to select a type of group payment vehicle, establish a card amount, select contributors (e.g., potential group participants or members) to invite, and enter a card name are shown. The contributors may be existing contacts of a GPV creator (e.g., in the GPV creator's mobile device or on an independent platform or app of a GPV facilitator) for the GPV creator to select to invite to an event.

Figure 4B:
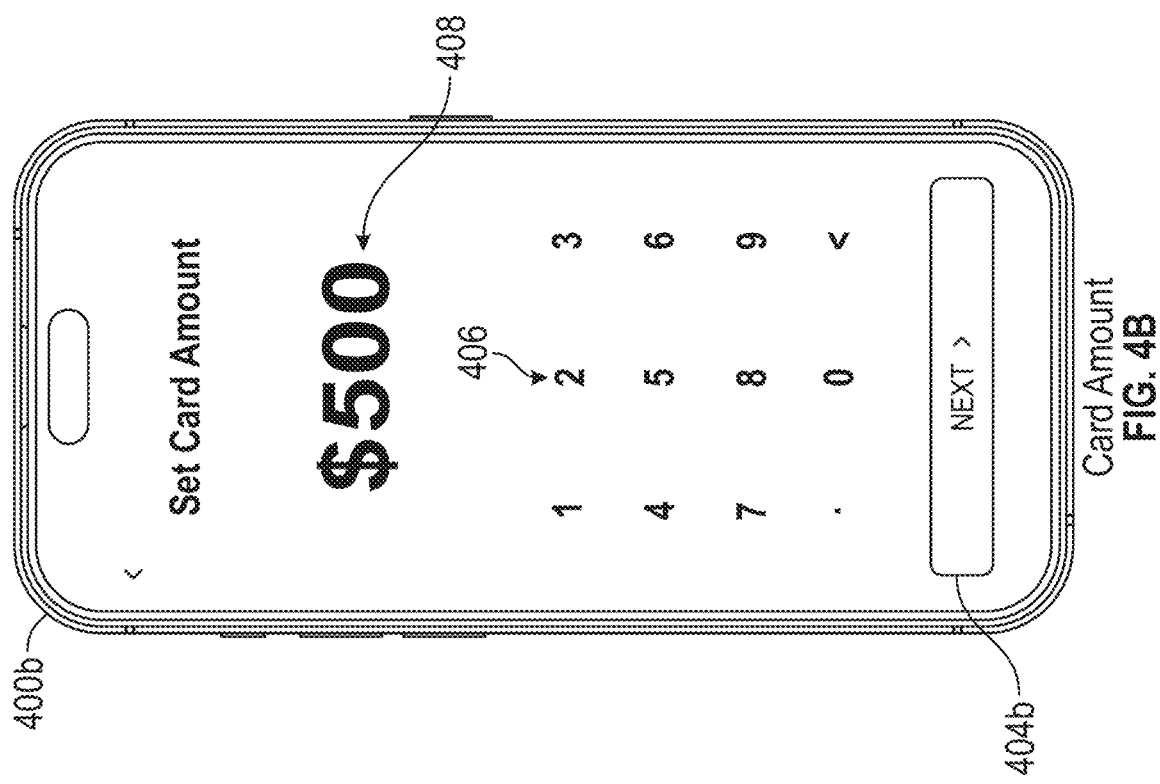
FIGS. 4A-4D are illustrative screen shots of user interfaces that enable a creator to select a type of group payment vehicle, establish a card amount, select contributors (e.g., potential group participants or members) to invite, and enter a card name.
Figure 4A:
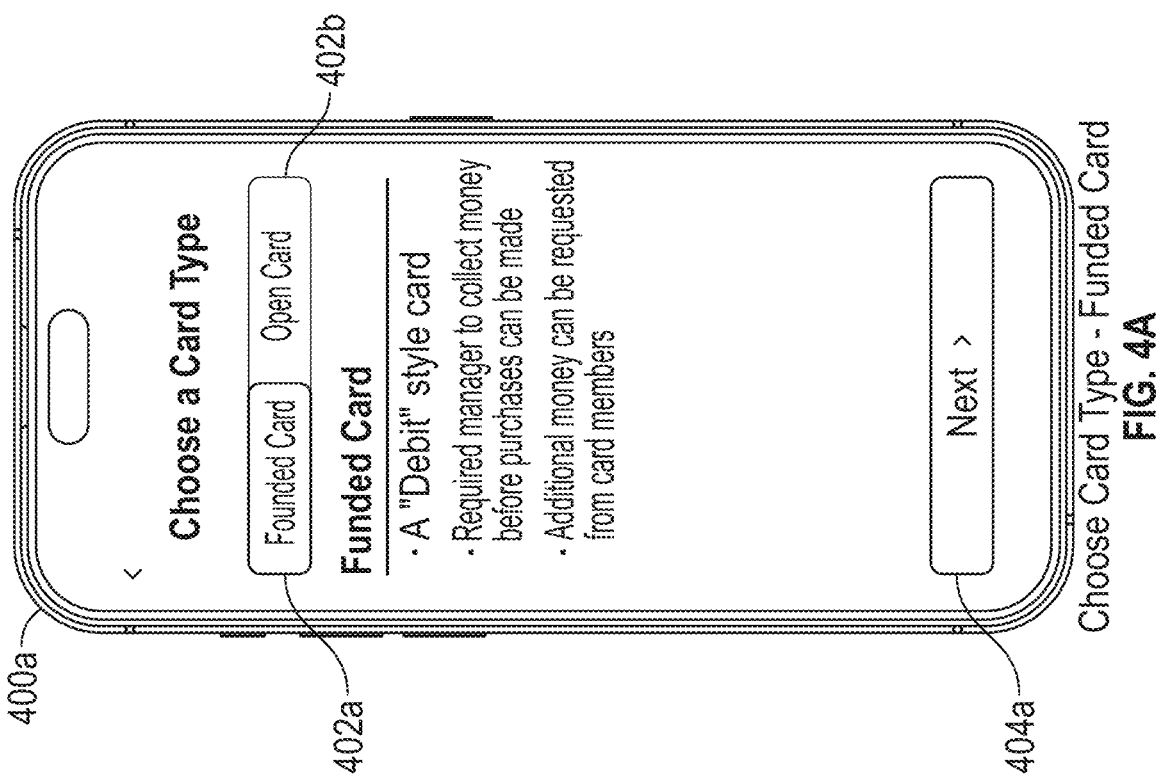
Figure 4D:
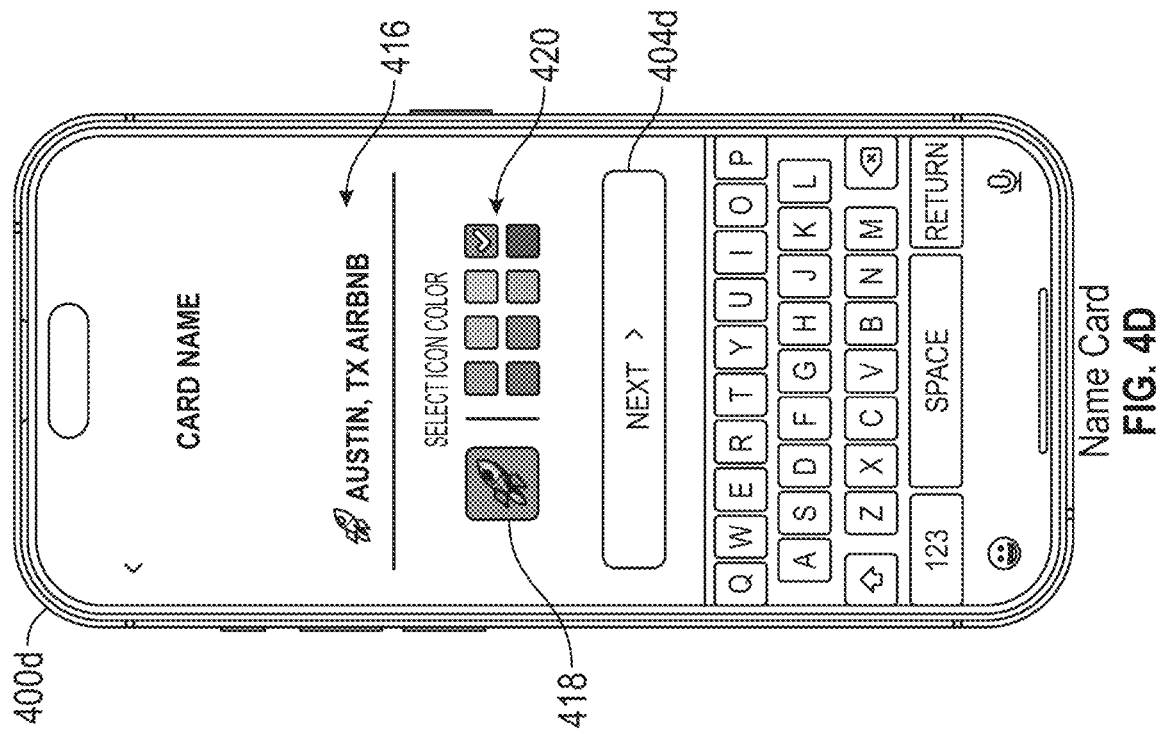
Figure 4C:
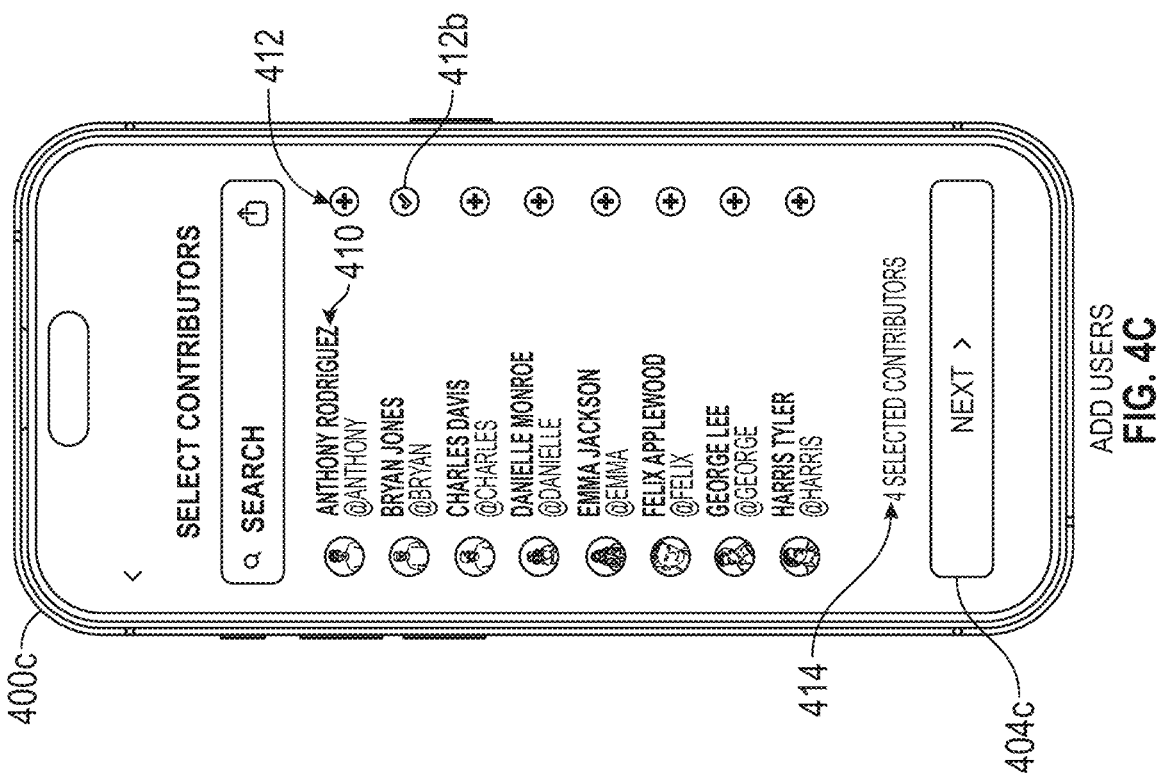

As shown in FIG. 4A, a GPV creator may select from amongst two card types, including a debit type ("funded card") 402a or credit type ("open card") 402b to create a group payment vehicle. Once selected, the GPV creator may select a "next" button 404a to move to the user interface 400b in FIG. 4B to enable the GPV creator to set a card amount. As shown, the GPV creator may use a virtual keyboard 406 (or voice transcription, for example) to enter an amount 408 (e.g., $500) to set the card at an initial amount. Once entered, the GPV creator may select a "next" button 404b to move to the user interface 400c for the GPV creator to select potential group members 410 to be contributors, optionally from the GPV creator's contact list or other accessible list of potential group members (e.g., member of the organization list). To add potential group members, the GPV creator may select corresponding add (e.g., "+") button(s) 412, such as add button 412b, which may turn into a remove (e.g., "-") button thereafter. A number 414 of selected contributors or group participants may be shown as the GPV creator continues to add and/or remove potential group participants or members. Once complete, the GPV creator may select a "next" button 404c to move to user interface 400d of FIG. 4D.

In the user interface 400d, the user may enter a card name 416, in this case, "Austin, TX AirBnB"), logo 418, card color from a color pallet 420. Once the card name, logo, color, and/or other distinguishing feature (e.g., GPV originator's name, photo, emoticon, or otherwise) is entered or selected, the GPV originator may select a "next" button 404d to complete the card creation process.

With regard to FIGS. 5A-5D, illustrative screen shots of user interfaces 500a-500d (collectively 500) that enables accepted group members 502a-502d (collectively 502), including a GPV creator 502a, to view each of the accepted or participating group members 502 in an event, such as a trip to Austin in which someone stays at an AirBnB, and see other group members are shown. In an embodiment, the GPV creator 502a may establish a GPV vehicle such that each of the accepted group members 502 pay an equal percentage 504a-504d (collectively 504) of a total amount 506 and an amount 508a-508d for each of the members 502 are shown. The user interface 500a may include a "split evenly" feature 510 that enables a GPV creator 502a to have the total balance 506 split evenly amongst the accepted group members 502. Upon completion, the GPV creator may select a "confirm split" button 512 that automatically splits the total balance 506 amongst each of the members 502 such that the amounts 508 are applied thereto.

If additional potential group participants become accepted group members, then the amounts shown may be lowered. For example, if the number of accepted group members increased from four to five, then the percentage to be paid by each of the group members may be lowered from 25% to 20% and the corresponding actual amount to be paid drops accordingly (assuming the event is a fixed total amount and the accepted group members are to split the total amount evenly) (see FIGS. 6A and 6B, for example).

With regard to FIG. 5B, if one of the members 502 decides that (i) he or she wants to participate differently by contributing more or less than the evenly split amount, (ii) become a manager of the GPV vehicle (iii) remove a member, or otherwise. As shown, each of the group members 502 are paying the same percentages 504a'-504d' and amounts 508a'-508d', but when the GPV creator 502a turns OFF the "split evenly" feature 510, then the amount or percentage may be changed using the user interface 500c. It should be understood that the GPV facilitator may enable the GPV creator 502a to set different parameters (e.g., different percentages or amounts) for each of the accepted group members 502 before or after accepting to become a group member (e.g., see FIG. 5C). As shown, the GPV creator 502a may use a keypad 514 to adjust a group member 516, such as Anthony Rodriguez, by changing amount or percentage for payment since the GPV. In an embodiment, the user interface 500c may enable the GPV creator to make the group member a GPV vehicle manager or card manager by selecting feature 517. The GPV creator may also remove the group member by selecting a "remove user" button 518. An amount 520 may be changed to a different amount by the GPV creator or change a percentage 522. Once complete, the GPV creator may select a "submit changes" button 512".

Figure 5D:
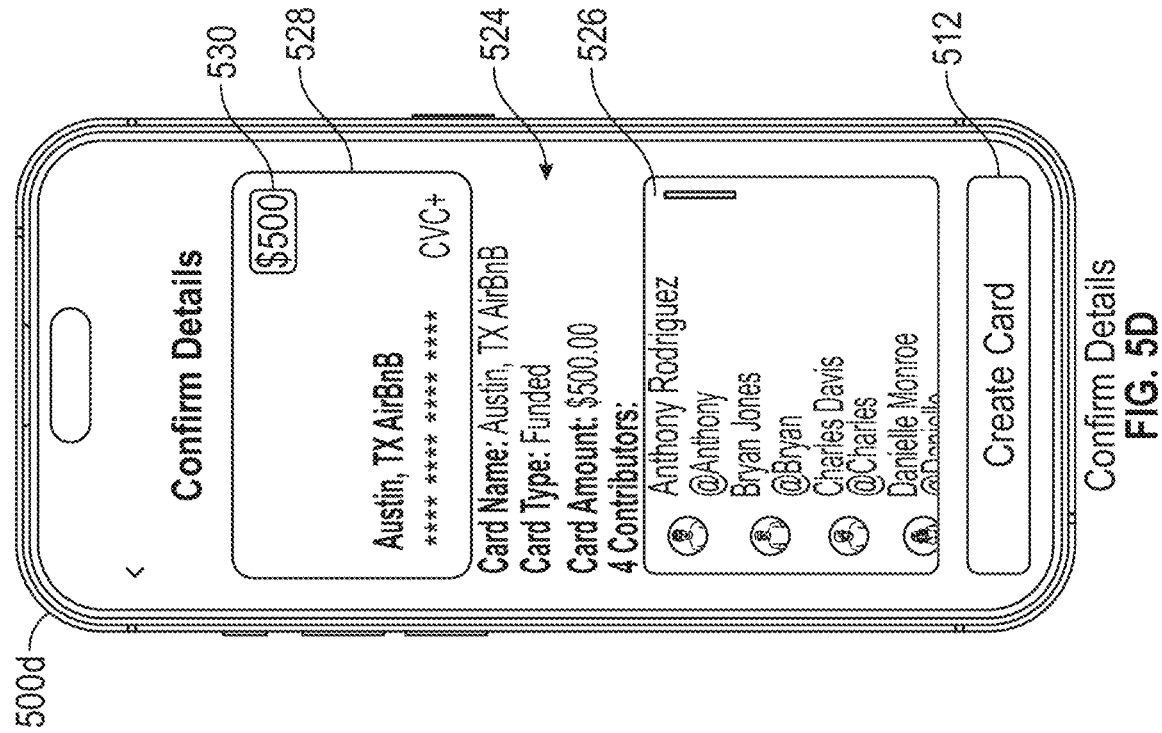
Figure 5C:
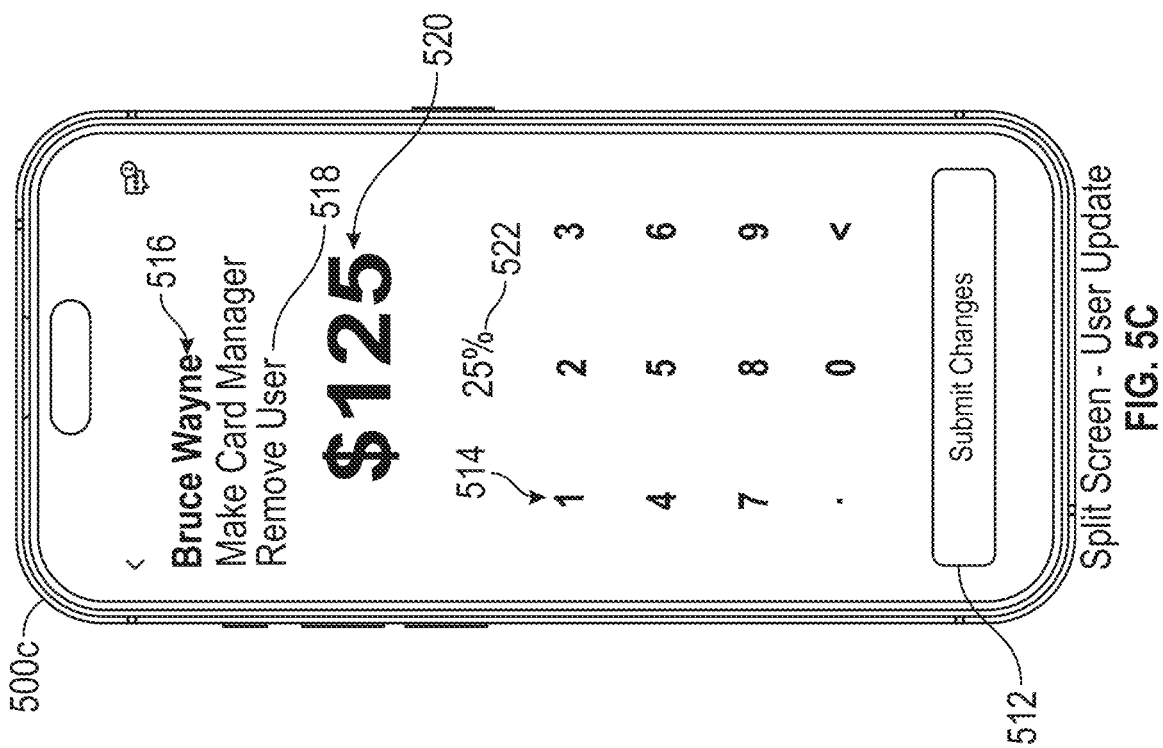

FIG. 5D is a screen shot that enables the GPV creator to view details of the GPV and accepted group members via a GPV group participant view user interface 500d of the user interfaces thereof before the event. The facilitator may configure the system to enable the GPV creator may be able to remove an accepted group member prior to the event, as provided in FIG. 5C or otherwise adjust the group or individual members (e.g., change names).

Figure 6A:
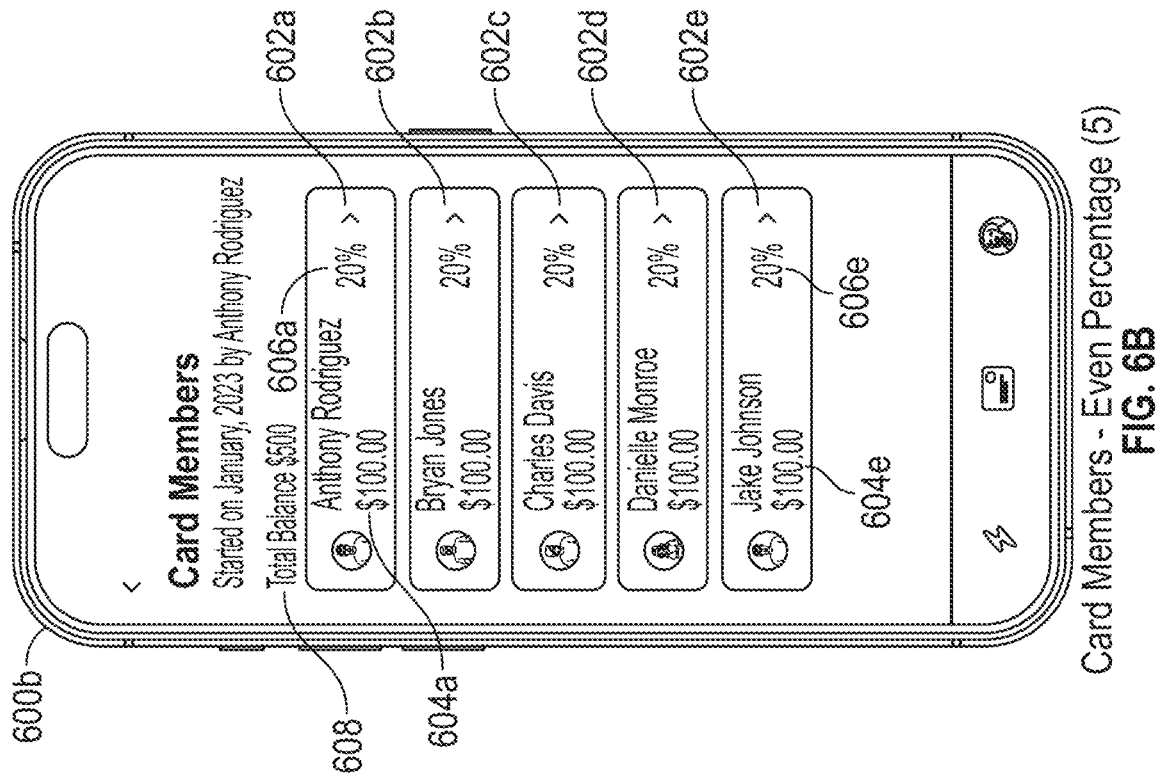
FIGS. 6A and 6B are illustrations of user interfaces of the system shows how an additional accepted group member changes the financial amounts for each of the accepted group members.
Figure 6B:
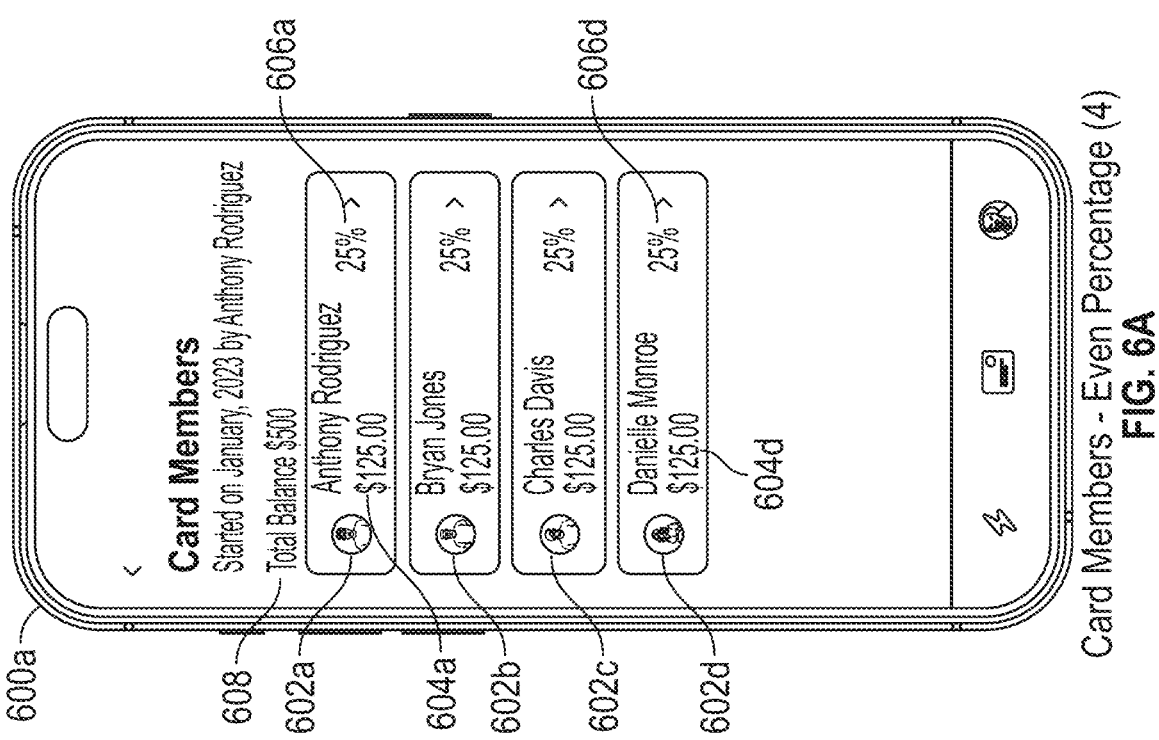

With regard to FIGS. 6A and 6B, illustrations of user interfaces 600a and 600b of the system shows how an additional accepted group member changes the financial amounts for each of the accepted group members 602a-602d (collectively 602) are shown. In FIG. 6A, each of the accepted group members 602 are to pay an even amount 604a-604d (e.g., $125) and percentage 25%. As a new accepted group member 602e is added, each of the accepted group members 602 may have the amounts 604 change to new amounts 604a'-604e' (e.g., changed from $125 to $100) and percentages 606a'-606e' (e.g., changed from 25% to 20%). A total balance 608 is shown to remain the same despite the number of accepted group members increasing from four to five.

Figure 7:
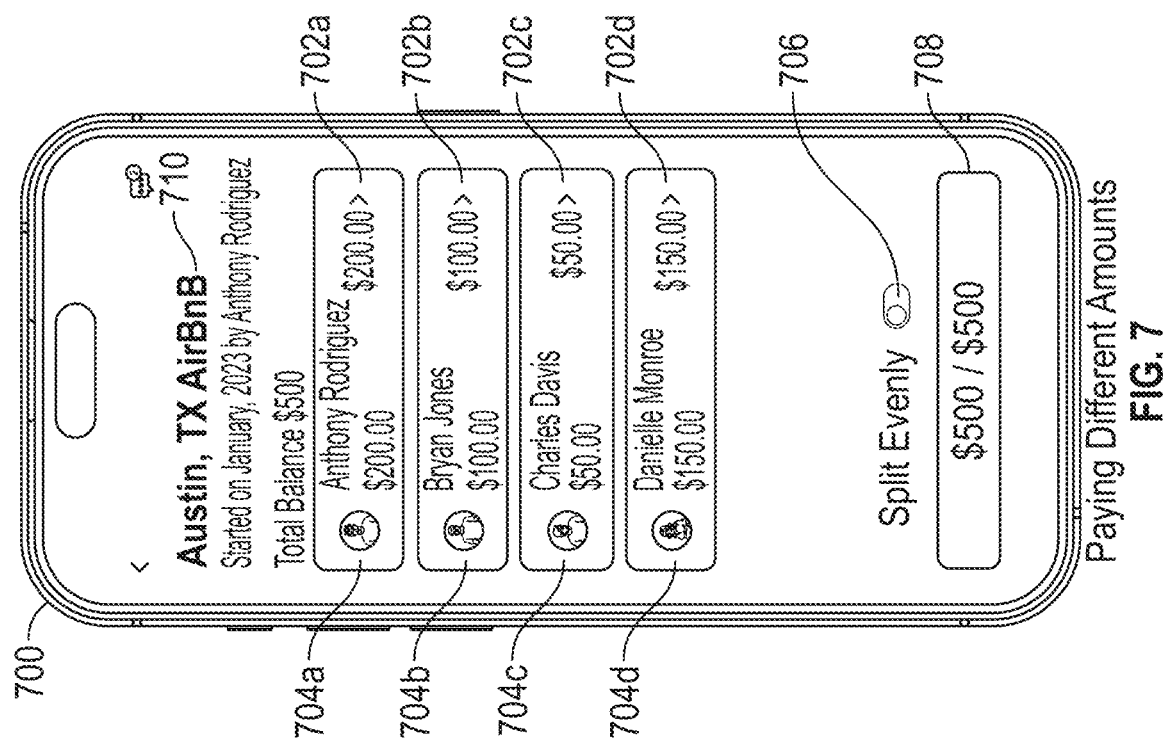
FIG. 7, an illustration of a user interface that enables a GPV creator to select a user interface element to either split the total balance of the event evenly or not evenly.

With regard to FIG. 7, an illustration of a user interface 700 with amounts 702a-702d (collectively 702) of respective accepted group members 704a-704d (collectively 704) that enables a GPV creator to select a user interface element 706 to either split the total balance of the event evenly or not evenly is shown. In this case, the GPV creator may not elect to split the balance evenly and may assign the same or different amounts 702 to each of the accepted group members 704 manually or otherwise (e.g., based on age, income bracket, gender, etc.).

Figure 8B:
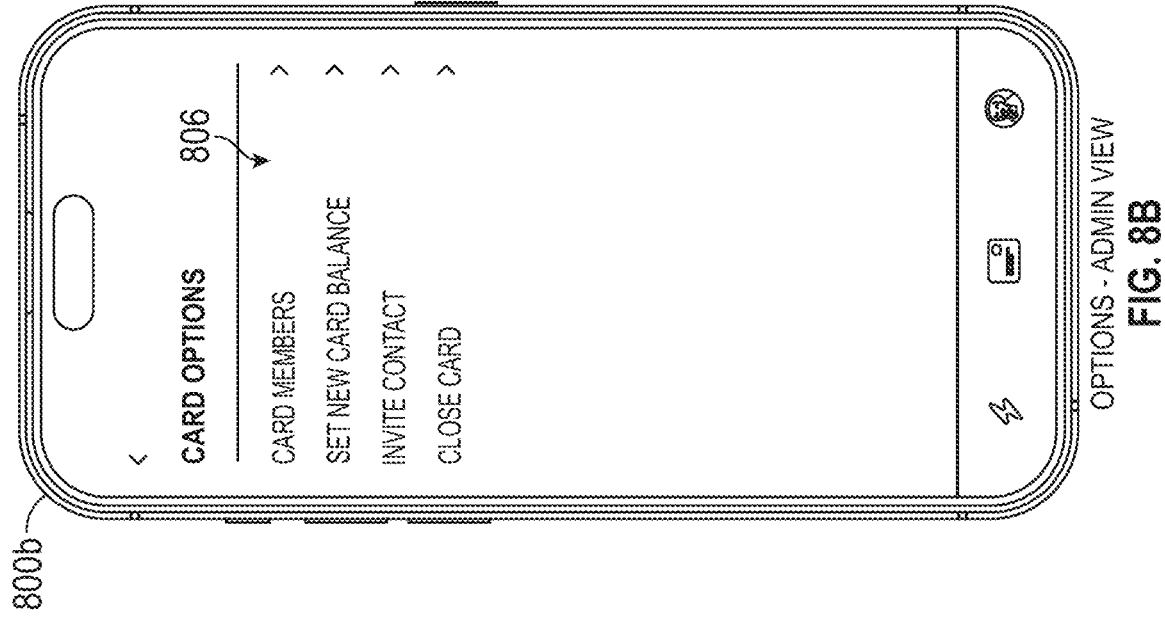
Figure 8A:
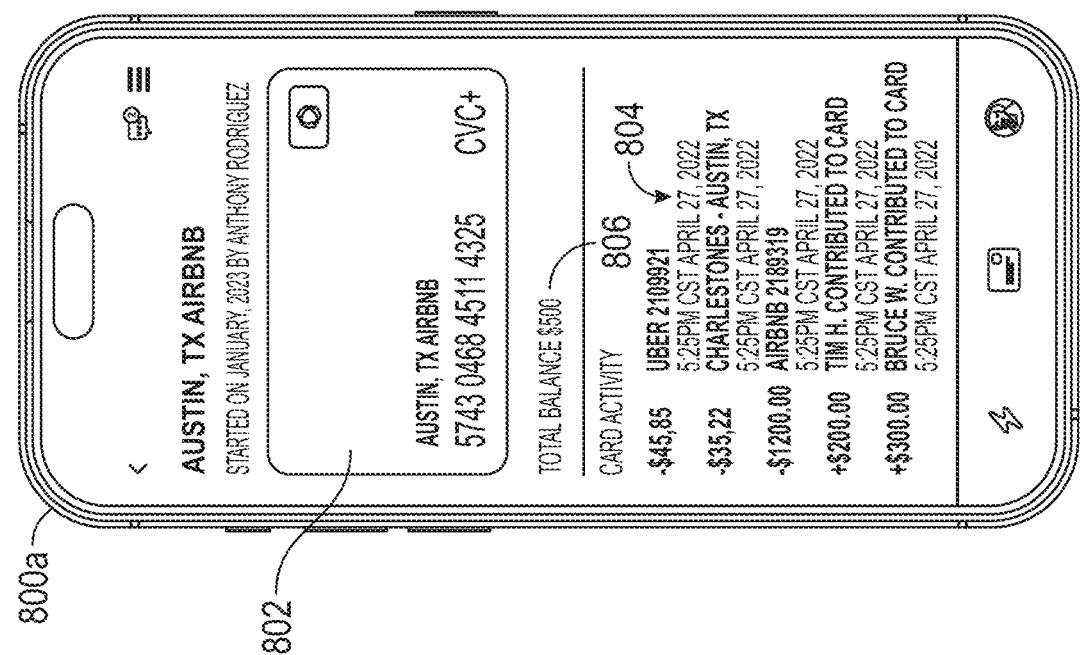

With regard to FIGS. 8A-8H, illustrations of illustrative user interfaces 800a-800h (collectively 800) of a GPV system that provide a GPV creator with an administration view and controls thereof are shown. FIG. 8A is a user interface 800a that enables the GPV creator to view the GPV 802 and associated information, such as transactions 804, total balance 804, and other information (e.g., GPV name, etc.). For the transactions, information associated with each of the accepted group members and respective payment mechanisms (e.g., credit card identifier with last four digits) and amounts paid may be shown.

FIG. 8B is an illustrative user interface 800b that enables the GPV creator to manage or adjust various options 806, (i) view card members (i.e., accepted group members) and associated information thereof, (ii) set new card balance (e.g., in the event additional event charges are needed), (iii) invite contacts to the event, and (iv) close the GPV after the event. In an embodiment, the GPV may be automatically closed after an event based on an initial setup of the GPV, as previously described. The GPV facilitator may establish a number of automated features to close, disable, or otherwise limit further use of the GPV based on a number of conditions, such as time limit (e.g., after a merchant is paid, after closing time of a merchant, after a predetermined event conclusion, etc.), geolocation (e.g., after the GPV creator leaves an event location, such as a venue or city), and so on, thereby minimizing potential misuse of the GPV.

FIG. 8C is a screen shot of an illustrative user interface 800c that enables the GPV creator to view card members (e.g., accepted event members) 808a-808d, amount paid 810a-810d, percentage 812a-812d of the total balance of the event to be paid, and so on in response to selecting to view card members from the card options 806 in FIG. 8B.

FIG. 8D is an illustrative screen shot of an illustrative user interface 800d that enables the GPV creator to close a card (i.e., a group payment vehicle) in response to selecting to close a card or GPV vehicle from the card options 806 of FIG. 8B. The GPV creator may elect to close a card in the event that the event for which the GPV vehicle was to be used is canceled, not enough members exist, or otherwise.

Figure 8F:
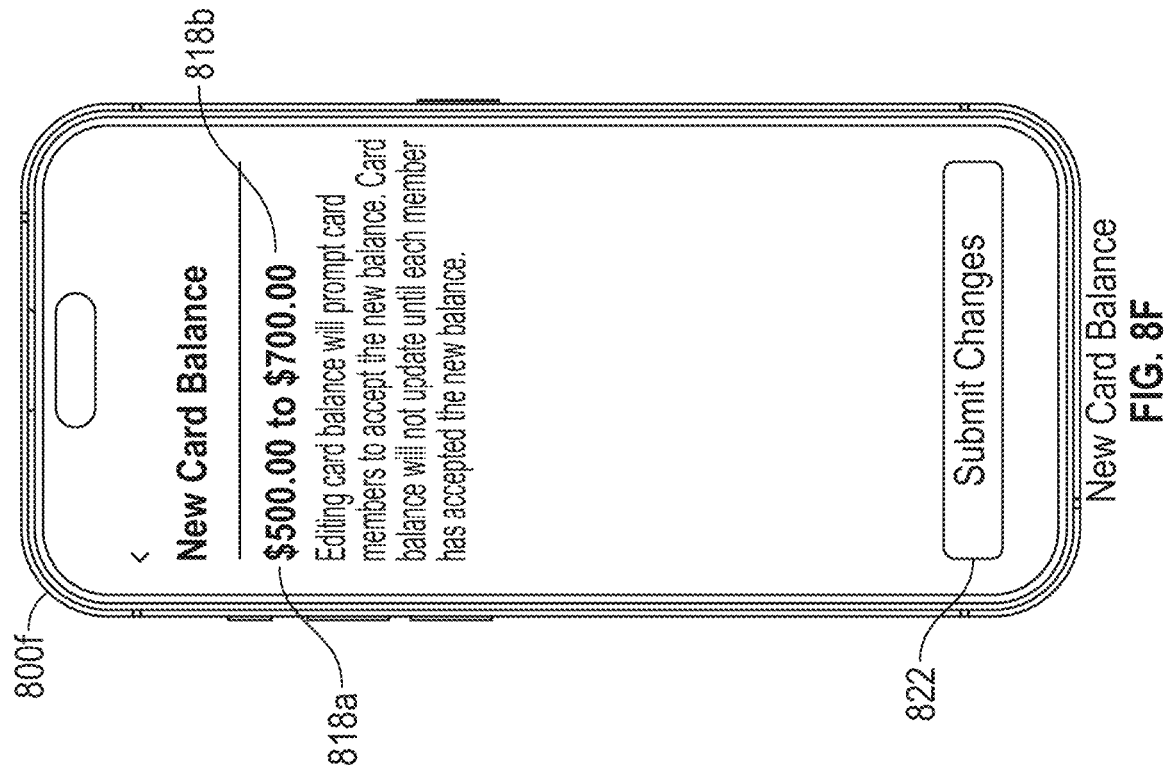
Figure 8E:
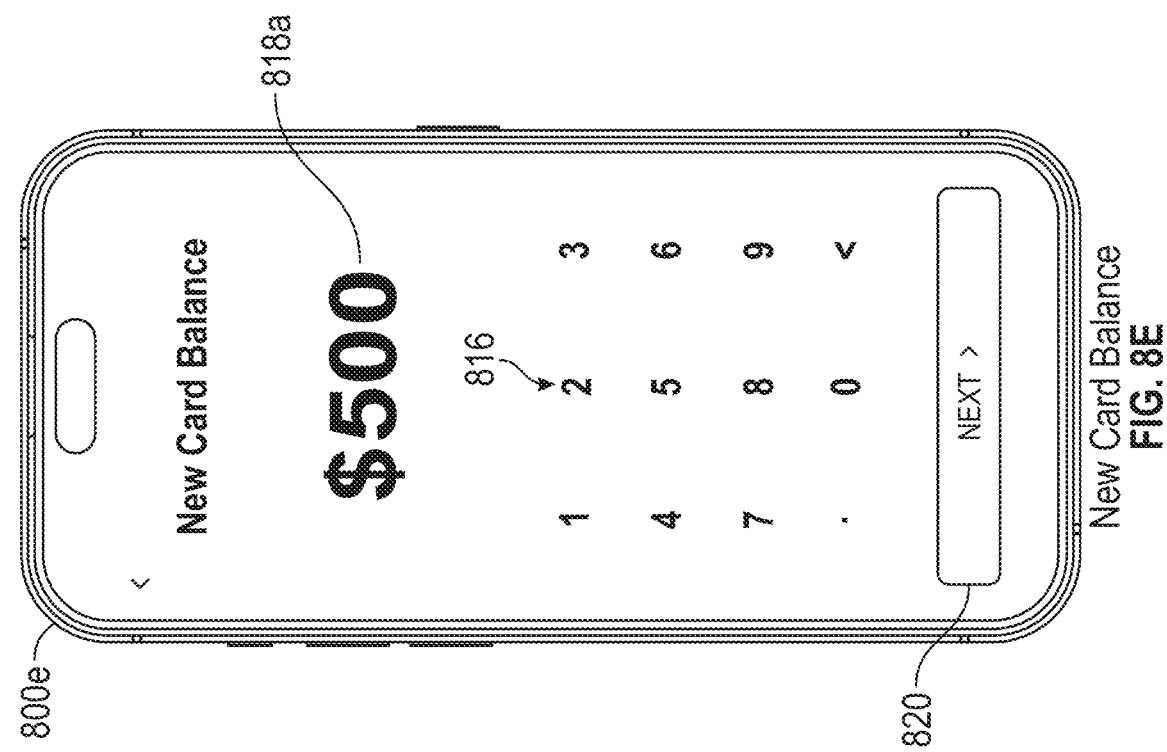

FIG. 8E is an illustration of an illustrative user interface 800e with a keypad 816 that enables the GPV creator to set a card balance 818a. The card balance may be set to an actual price of a vendor(s) or be set to be higher than the anticipated actual price of vendor(s). For the debit type GPV, if additional funds remain after vendors are paid, the GPV system interface may enable the GPV creator to set an automatic reimbursement or manual reimbursement to return funds to the accepted event members. For example, if each of the accepted event members paid an equal 25% of the total balance and a $100 reimbursement is to be made, then each of the accepted event members may receive $25 either automatically after the event (e.g., prior to the GPV being closed) or in response to the GPV creator manually selecting to reimburse the accepted event members. In an embodiment, the accepted event members may be provided access to a "request reimbursement," which may prompt the GPV creator to accept or deny the reimbursement request. Once completed, the GPV creator may select a "next" button 820 to move to a next user interface, such as shown in FIG. 8F.

With regard to FIG. 8F, an illustration of an illustrative user interface 800f that enables the GPV creator to display an old and new balance of the GPV is shown. The GPV creator may want to or need to change the balance of the GPV due to a change of event plans and/or vendors, increased or decreased number of accepted group members, not receiving enough or receiving too many accepted group members, or so on. Once the balance is changed and the GPV creator agrees, the GPV creator may press a "Submit Changes" button 822, thereby submitting the new balance. In an embodiment, the new balance may be applied to all of the current accepted group members and future accepted group members or be limited to just future accepted group members of an event and currently accepted group members may remain fixed for their approval as a percent or fixed amount of payment. The amount for the currently accepted group members may be adjusted proportionately, as previously described.

As shown in FIG. 8G, an illustration of an illustrative user interface 800g that enables the GPV creator to invite contacts 824 is shown. The contacts 824 may be personal contacts of the GPV creator (e.g., as stored locally on a mobile device, such as a smart phone, of the GPV creator or stored in a contact list of a platform). As understood in the art, the contacts may have network addresses (e.g., phone numbers, email addresses, instant messages, social media, or otherwise) associated therewith to which invitations for an event may be communicated via a communications network. The contacts may be selectable via a graphical user element (e.g., "+" symbol) 826, and in response to selection by the GPV creator, electronic invitations (e.g., text, graphical, etc.) may be communicated to invited potential group participants of an event. The electronic invitations may include accept and decline buttons that enable the invitees to accept or decline the invitation. As shown, a user may add a contact, e.g., Bryan Jones 824b, by selecting graphical user element 826b.

As shown in FIG. 8H, an illustration of an illustrative user interface 800h that enables the GPV creator to send or share messages 830 with one or more potential group participants and/or accepted group members. For example, the GPV creator may be able to send updates about the event, communicate information about scheduling changes, send general messages, or otherwise, by entering a text message in a text field 832 and submit by selecting graphical user element 834.

Figure 9D:
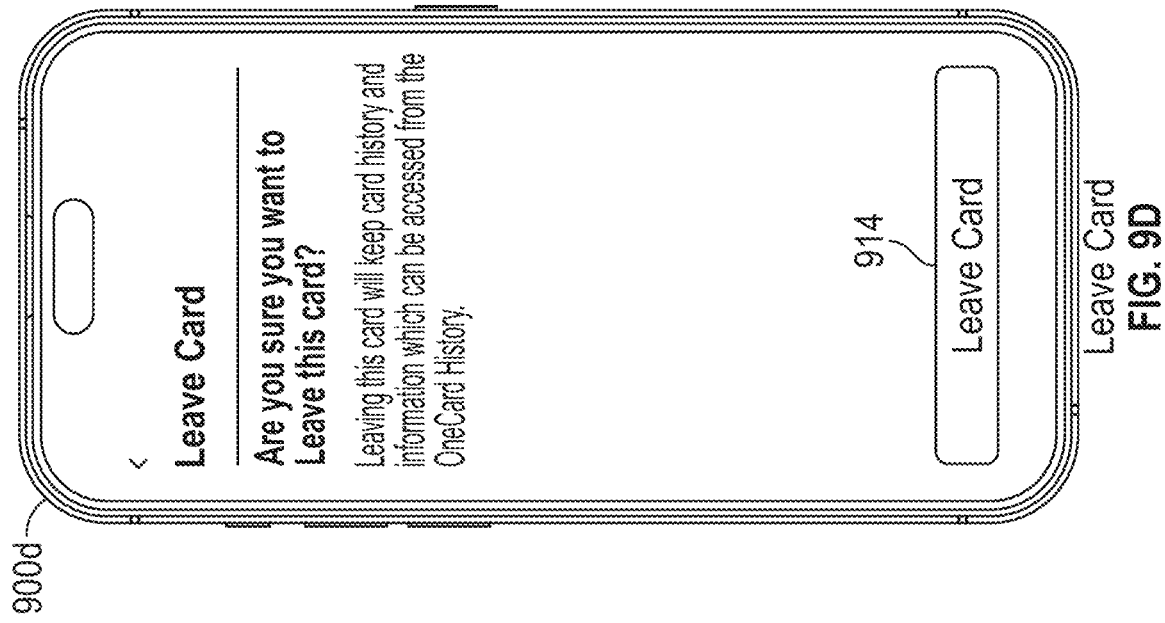

With regard to FIGS. 9A-9E, illustrations of illustrative user interfaces 900a-900e (collectively 900) of a GPV system that supports a debit type GPV 902 and provide a GPV creator, potential group participants, and/or accepted group members to view other participants and perform various functions are shown. As shown in FIG. 9A, the user interface 900a showing a fully funded GPV (e.g., virtual card) 902 with a name 904 (e.g., "Geatry Hotel") with activity 906 and that is fully funded with $500 908 is shown. The activities 906 of the debit type GPV 902 may be listed to show amounts, time, vendors (payees), etc. so that the GPV creator, potential group participants, and/or accepted group members to view to ensure proper usage of the GPV. A current balance may also be shown.

Figure 9C:
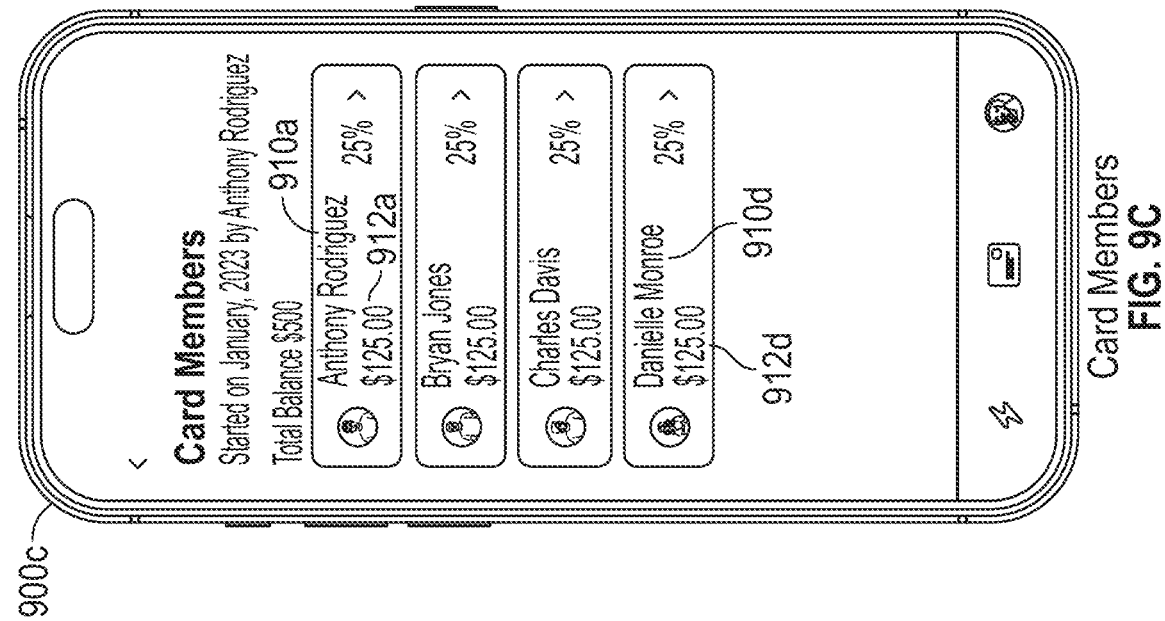

With regard to FIG. 9B, a screen shot of an illustrative user interface 900b that provides options 909 that enable the GPV creator, potential group participants, and/or accepted group members to view card members (i.e., accepted group members including the GPV creator if participating in the event (see FIG. 9B)), and leave the card (see FIG. 9D). In the event of an accepted group member leaves the GPV 902, the GPV system may enable the GPV creator and accepted group members to view card members (see FIG. 9C) and send messages (see FIG. 9E). More specifically, and as shown in FIG. 9C, each of the respective accepted group members 910a-910d (collectively 910) have respective allocations 912a-912d (collectively 912) are shown. The allocations 912 shown as cash amounts and respective allocation percentages may automatically adjust in the event that an accepted group member leaves the GPV 902 using the user interface 900d of FIG. 9D. For example, the allocations 912 that are set at 25% because four group members 910 initially exist may adjust proportionally if one group member 910d of the group members 910 leaves the GPV 902. If one of the four group members 910 leave, then the allocations 912 may change from $125 to $166.67 (i.e., 25% to 33% of the total balance 908). Alternatively, the GPV creator may be notified and be allowed to adjust the allocations 912 for the remaining accepted group members 910a-910c. User interface 900e of FIG. 9E shows messages 916 of a group chat, and each of the accepted group members 910 may use a test entry field 910 to enter a message and upload or post the message for others to view using a button 920.

Figure 10B:
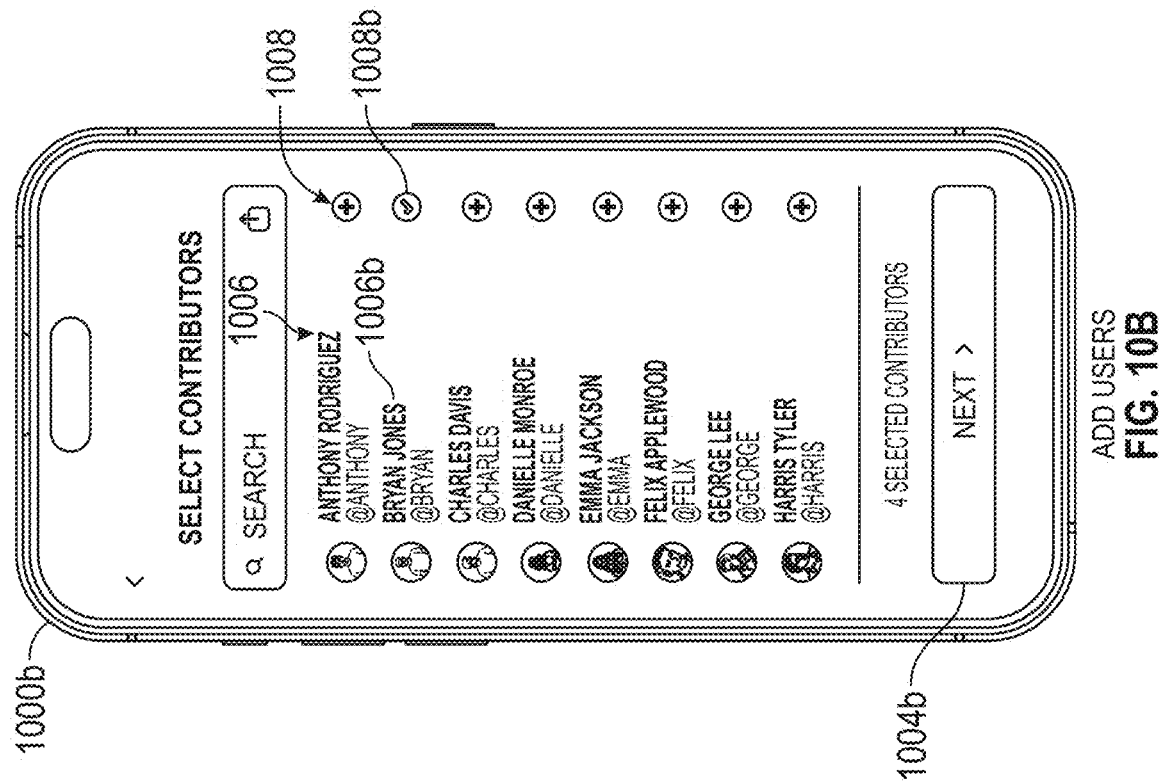
Figure 10A:
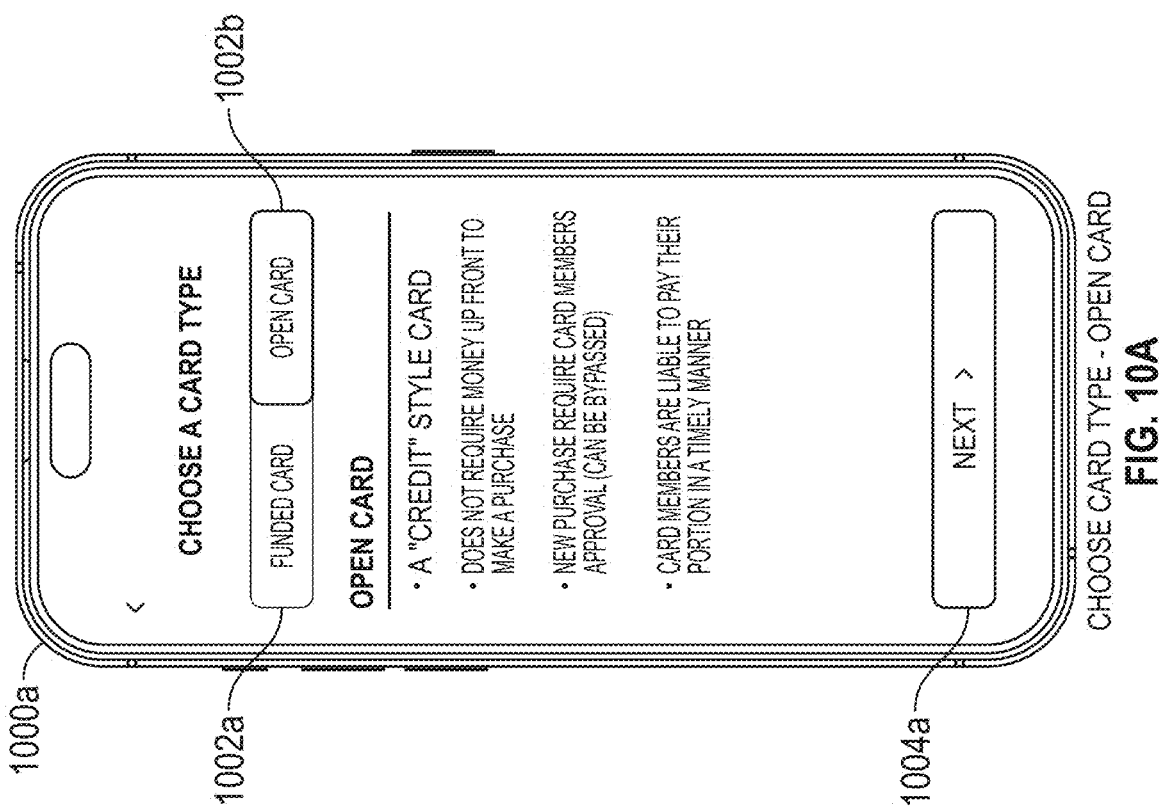

With regard to FIGS. 10A-10D, illustrations of illustrative user interfaces 1000a-1000d (collectively 1000) of a GPV system that supports selection of a debit-type GPV ("Funded Card") option 1002a or a credit type GPV ("Open Card") option 1002b, and provide a GPV creator with the ability to establish and manage a GPV that enables accepted group members to attend an event and make payments after an event occurs is shown. FIG. 10A enables the GPV creator to select one of the two selectable options 1002a and 1002b. After selecting the selectable option 1002b, for example, the GPV creator may select a "Next" button 1004a to move to user interface 1000b. In FIG. 10B, the GPV creator may select contributors or potential group participants 1006 using selector elements 1008. As shown, the GPV creator has selected potential group participant 1006b by selecting corresponding selector element 1008b, which may initiate an electronic invitation to be communicated thereto, as previously described with regard to FIG. 8G. In FIG. 10C, the GPV creator may enter a card name 1010 and select an icon 1012 and/or color 1014 for the icon 1012. Additional and/or alternative information and/or graphical features may be available for the GPV creator to view and/or select may be provided on the user interfaces 1000 or another user interface. In FIG. 10D, the user interface 1000d may be an electronic invitation that is sent to a selected potential group participant, such as potential group participant 1006*b*. Buttons 1016*a* and 1016*b* for respectively declining and accepting the invitation are available for the selected potential group participant 1006*b*. Additional information may also be provided, such as an estimated amount of the event for which the potential group participant is being invited, number of other invitees (potential group participants), number of accepted group members, and so forth. A card type (i.e., credit-type or debit-type) may also be presented to the potential group participant so that the potential group participant knows when payment is to be made.

Figure 11:
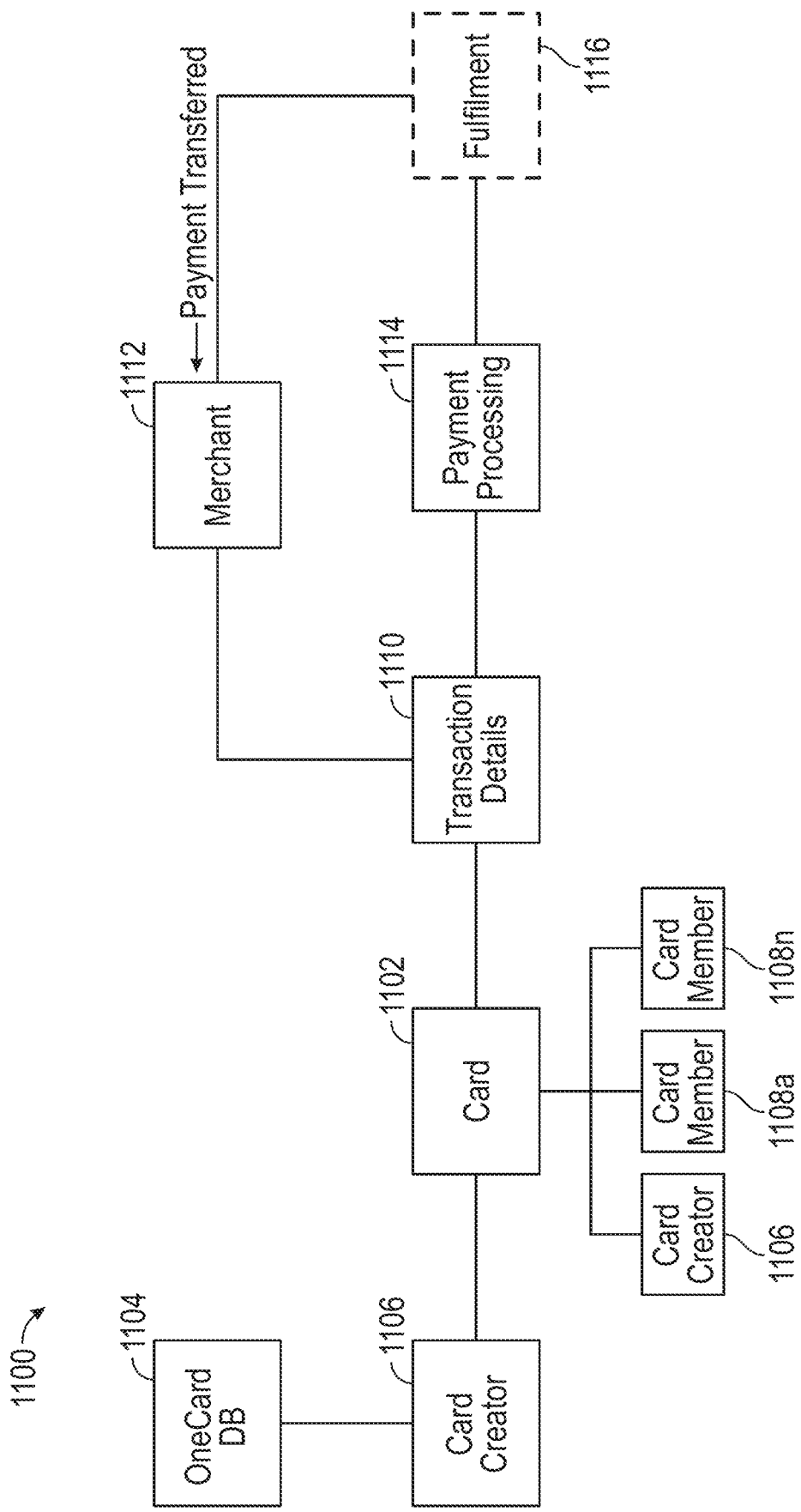
FIG. 11 is a block diagram of an illustrative representation of a system and process for a card or GPV creator to establish a GPV, invite potential group participants such that accepted group members may become card members.

With regard to FIG. 11, a block diagram of an illustrative representation of a system and process 1100 for a GPV 1102 to be created by a GPV creator 1104 to establish a GPV 1102, invite potential group participants such that accepted group members may become card members is shown. A database 1104, which may be operated on a cloud server, may be configured to manage information associated with the GPV 1102, GPV creator 1106, accepted card members 1108*a*-1108*n*, and/or any other information to support a GPV may be utilized. In an embodiment, the accepted card members 1108*a*-1108*n* (collectively 1108), which may also include the card creator 1106 if an accepted group member who is participating in an event for which the GPV 1102 is established, become financially connected to the GPV 1102 in that the accepted group members 1106 and 1108 submit respective payment mechanisms (e.g., debit cards, credit cards, etc.) to the database 1104 to be associated with the GPV 1102. Thereafter, the GPV 1102 may be utilized to perform transactions 1110 with merchants 1112. If the GPV 1102 is a debit-type GPV, then the GPV 1102 may be prefunded during a fulfillment process 1116, as previously described. If the GPV 1102 is a credit-type GPV, then the GPV 1102 may be used to pay a merchant and then reimbursement to the GPV 1102 may be performed automatically after an event during the fulfillment process 1116 as the respective payment mechanisms are connected with the GPV 1102, as further described herein.

Figure 12A:
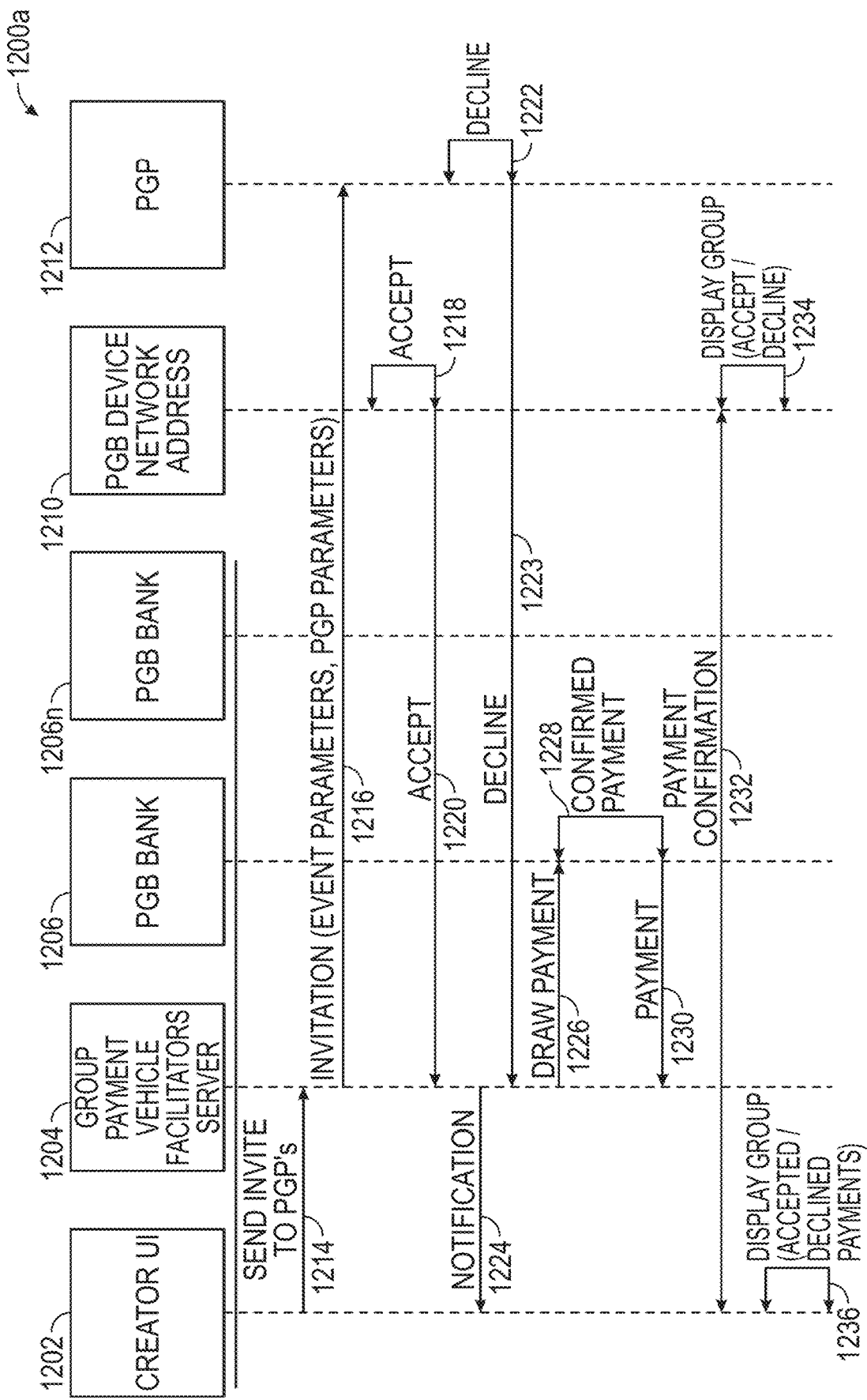
FIGS. 12A and 12B are illustrative interactive diagrams that include hardware and software modules to support GPV creation, group planning, and potential group participants (PGP) usage.
Figure 12B:
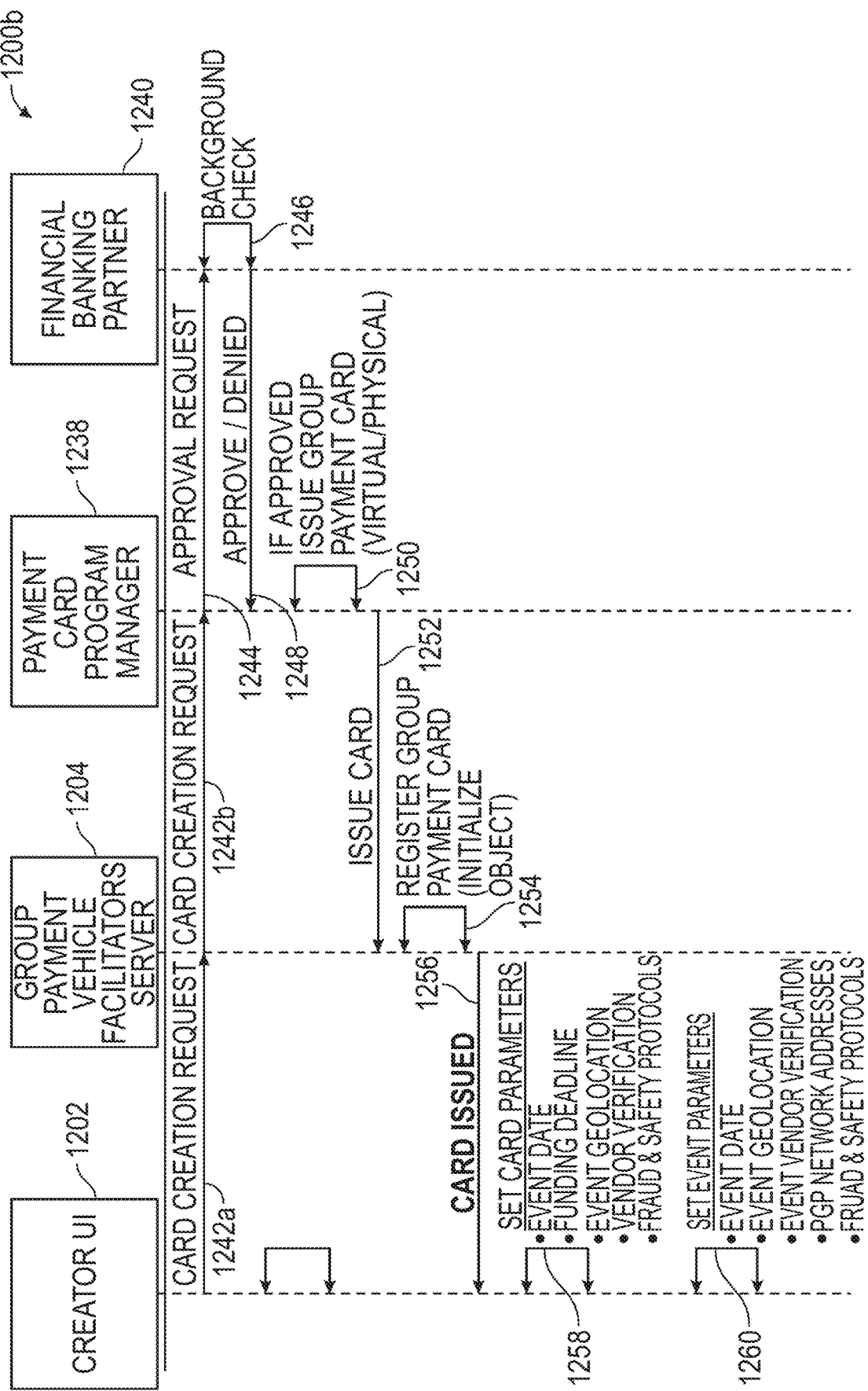

With regard to FIGS. 12A and 12B, illustrative interactive diagrams 1200*a* and 1200*b* (collectively 1200) that include hardware and software modules to support GPV creation, group planning, and potential group participants (PGP) usage are shown. A creator user interface 1202 may be provided for a GPV creator to use. A group payment vehicle facilitators server 1204, which may be a cloud server, bank servers of PGPs (PGP bank servers) 1206*a*-1206*n* (collectively 1206) when the PBPs become accepted PGPs, PGP electronic device(s) (e.g., smartphones via an app or SMS message, desktop computers via an email, etc.) 1210 having unique network addresses, and the PGP(s) 1212 associated with the PGP electronic device(s) 1210.

In operation, the GPV creator may use the GPV creator user interface 1202 to create and send electronic invitations at steps 1214 and 1216 to the PGPs 1212. A single PGP 1212 and invitation with event parameters and PGB parameters are represented, but it should be understood that many more may electronic invitations may be sent to corresponding PGPs 1212. The invitation from the creator user interface 1202 may be communicated at step 1214 to a group payment vehicle facilitator server 1204 that may be configured to send the invitations to the potential group participants 1212. Each of the potential group participants 1212 may receive the electronic invitations and elect to accept or decline the invitations at steps 1218 and 1222 optionally via user interface 1000*d*. In an embodiment, the invitations may be communicated via short message service (SMS) text messages and include a link for accepting or declining the invitation. Alternatively, the electronic messages may be sent via an email and include buttons for accepting or declining the invitation. If a mobile app exists and used by the PGPs 1212, electronic invitations may be made via the mobile app. In response, the electronic devices 1210 of the potential group participants 1212 may communicate an acceptance or decline communication at respective steps 1220 and 1223 back to the payment group vehicle facilitator server 1204 for processing thereby.

If a potential group participant 1212 accepts, the potential group participant becomes an accepted group member 1212 and a notification may be communicated to the GPV creator user interface 1202 at step 1224. The group payment vehicle facilitator server 1204 may communicate an electronic message to one of the servers 1206 of a potential group participant bank to draw payment therefrom at step 1226. The PGP bank server 1206*a*, for example, may confirm payment at step 1228 and payment 1230 or notification thereof to the GPV facilitators server 1204 (or elsewhere) may be performed at step 1230. If the payment is declined for any reason, the system executing on the group payment vehicle facilitator server may not allow the potential group participant 1212 to become an accepted group member, but may also communicate a notification to the potential group participant that his or her payment mechanism has been declined with a request to submit a different payment mechanism. If another payment mechanism is accepted, then the potential group participant 1212 may be allowed to become an accepted group member. Prior to sending the payment request, the potential group participant may enter a payment mechanism, such as a credit card number and other information associated there with, bank account number and other information associated therewith, or other payment mechanism information that enables the group payment vehicle to be funded if the GPV is a debit-type GPV or ensure that funding or reimbursement is available using a particular payment mechanism to be made if the GPV is a credit-type GPV.

If the potential group participant has his or her payment mechanism information stored with the group payment vehicle facilitator server 1204, then responsive to the potential group participant 1212 accepting the invitation, the group payment vehicle facilitator server 1204 may automatically use the payment mechanism information to draw payment. A confirmation of the payment mechanism may be made if payment is confirmed at step 1232, then the group payment vehicle facilitator server 1204 may update information associated with the GPV such that information associated with the now accepted group member may be displayed at step 1234 as a group member and optionally card member, as previously described. Payment confirmation from the group payment vehicle server 1204 may be communicated to the creator user interface 1202 so that the GPV creator may view accepted group members along with each of the potential group participants 1212 at step 1236 and/or accepted group members may be able to see how many and which potential group participants 1212 have accepted the invitation, declined the invitation, and/or not yet responded to the invitation at step 1234. It should be understood that the potential group participants (i.e., invitees), accepted group members, and declined invitees.

With regard to FIG. 12B, after a GPV creator selects to establish a group payment vehicle by selected an GPV amount and creator identifier (ID), an GPV creation request via the GPV creator user interface 1202 may be communicated to the group payment vehicle facilitators server 1204 at step 1242*a*. The request may include the GPV amount and creator ID, and the GPV facilitator server may assign an GPV ID thereto. The GPV facilitators server 1204 may submit a GPV approval request inclusive of a facilitator ID, creator ID, and GPV amount to a payment card program manager (e.g., bank, credit facility, etc.) at step 1242*b*, which may be operating a server 1238 to perform approval GPV functions. A financial banking partner 1240, such as a larger banking institution, underwriter, federal agency, etc., may be sent an approval request at step 1244, where the approval request may be inclusive of a manager ID, facilitator ID, creator ID, and/or GPV amount. In response, the financial partner 1240 may perform a background check and/or perform other checks at step 1246 to confirm that the GPV creator, facilitator, and program manager are approved for issuing the GPV or denied at step 1248. If approved, a GPV may be issued at step 1250. The GPV may be virtual or physical, and the GPV may be issued at step 1252 and registered by the GPV facilitator server 1204 at step 1254. In registering the GPV, a data object associated with the GPV may be initialized. The data object may be utilized for a GPV, and include a number of fields or parameters, including, but not limited to, GPV creator ID, GPV type (debit or credit), GPV amount, GPV name, GPV ID, facilitator ID, IDs of accepted group members, electronic addresses of accepted group members, payment mechanism information (e.g., routing number and bank account number), event information (e.g., event date and time, end of event date and time, IDs of vendors, geolocation of event, etc.), thereby providing the system with the ability to manage the GPV and automatically or semi-automatically turn OFF or shut down the GPV so as to avoid fraudulent usage of the GPV, for example. The GPV may be issued by the facilitator and notification/access sent to the GPV creator and available for viewing in the GPV creator user interface 1202 at step 1256. At steps 1258 and 1260, the GPV creator may populate the data object by setting various parameters, including GPV parameters, such as event date, funding deadline, event geolocation, vendor verification or other information, fraud and safety protocols, and event parameters, such as event date (may be in one or both of the GPV and event parameters), event geolocation, event vendor verification, potential group participants names, network addresses of potential group participants, fraud and safety protocols, and so on.

Once the GPV is established and data object associated with the GPV is populated, the GPV may be utilized by the GPV creator to may proxy payments (i.e., payment made on behalf of the other accepted group members) to vendors as previously described. The system of the facilitator may be configured to manage usage of the GPV, collect payments from the accepted group members (prior to or after usage of the GPV depending on card type), and perform fraud prevention operations.

Figure 13:
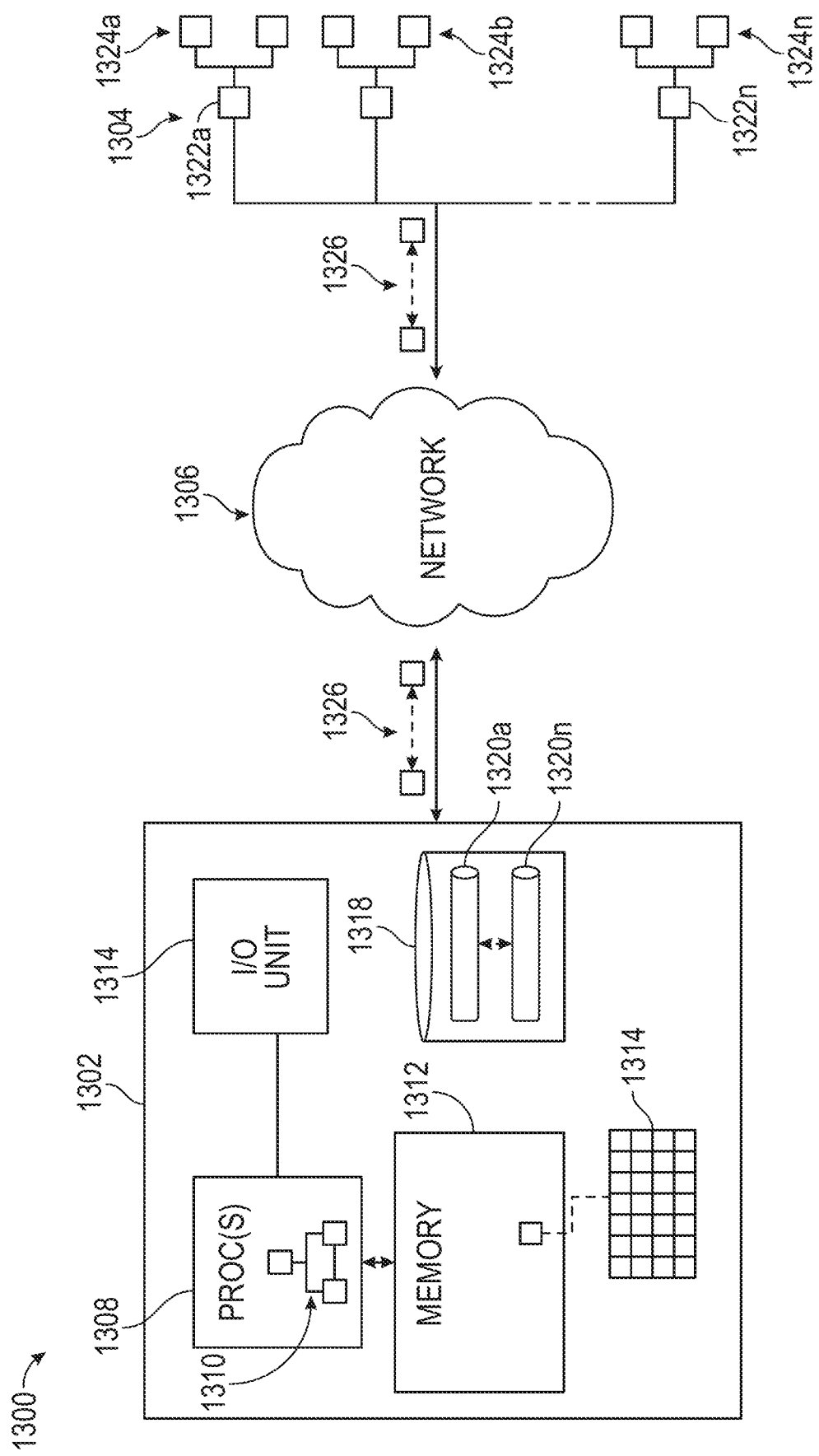
FIG. 13 is a block diagram of an illustrative system for supporting a group payment vehicle described herein.

With regard to FIG. 13, a block diagram of an illustrative system 1300 for supporting a group payment vehicle described herein is shown. The system 1300 may include a server 1302 in communication with electronic devices of potential group participants 1304 via a communications network 1306. The server 1302 may be a cloud server, and may include a processor 1308 that executes software instructions 1310 that cause the processor(s) 1308 to perform certain functions, as further described herein. The processor(s) 1308 may be in communication with a non-transitory memory 1312 configured to store data therein. The data may be configured as data objects 1314, which may include memory cells that are linked together via memory locations, such as link lists, tree structures, or otherwise. The processor(s) 1308 may further be in communication with an input/output (I/O) unit 1316 configured to communicate data locally or remotely, such as via the communications network 1306. The processor(s) 1308 may further be in communication with a storage unit 1318, such as a disk drive, solid-state memory, or other storage unit, is configured to store data repositories 1320*a*-1320*n* (collectively 1320) for storing data therein. In an embodiment, the data repositories 1320 may store data that is stored in the data objects 1314 so as to support establishing, operating, and closing the group payment vehicles, as described herein.

The potential group participants 1304 who use the group payment vehicle supported by the system 1300 may be organized by group payment vehicle creators 1322*a*-1322*m* (collectively 1322) who then invite potential group members 1324*a*-1324*n* (collectively 1324) through messaging via the server 1302, which may communicate event messages to the invited potential group members via a mobile app, email, text messages, or otherwise. In creating and sending invites, the group payment vehicle creators 1322 may select the potential group members in a manner that includes network information (e.g., name, network address, mobile phone number, etc.), as previously described with regard to the user interfaces. Data 1326 that includes information of the group payment vehicle creators 1322 and potential group members 1324 may be communicated with the server 1302 for creating and populating the data objects associated with each group payment vehicle and/or each of the group payment vehicle creators 1322. When potential group members 1324 accept the respective invitations (e.g., using the mobile app (see, for example, FIG. 10D), email, text messages, or otherwise), information, such as bank name, mobile phone number, bank coordinate information, credit card information, debit card information, etc., of accepted group members may be communicated via the data 1326 to and from the group payment vehicle creators 1322 and respective accepted group members 1324 that accepted to become part of a group and, thus, logically connected with the respective group payment vehicle. In being logically connected, the accepted group members 1324 may have payment information (e.g., credit card information, debit card information, bank account information, etc.) tied to the group payment vehicle such that the data objects 1314 are relationally (and financially) tied with one another. Thereafter, as the group payment vehicles are utilized, the server 1300 may coordinate transactions and management of the group payment vehicles. It should be understood that third-party payment processor system(s) may be utilized for performing the actual payments of the group payment vehicle and financial instruments (e.g., credit cards, debit cards, etc.) logically connected with the group payment vehicle.

As a further example of the data objects 1314, a table, linked lists, tree structure, or any other database or collection of non-transitory memory cells that may be utilized to establish a relationship between the group payment vehicle for an event, group payment vehicle creator, potential group members, and accepted group members may be utilized. By utilizing data objects 1314, the information associated with each group associated with a group payment vehicle may be dynamically updated such that the data stored in the data objects 1314 remain current in real-time. In an embodiment, rather than using a centralized system, such as the server 1302, a decentralized data system, such as one or more blockchains, may be utilized. As an example, a blockchain that is stored on the electronic devices of multiple or all of the accepted group members 1324, including the group payment vehicle creators 1322, may be utilized, thereby allowing for security, backup, and immutability of the data associated with the group payment vehicle prior to, during, and after the event. In an embodiment, the server 1302 or other electronic system that is available to an operator of the platform, may also include a blockchain for each of the group payment vehicles, thereby enabling the operator of the platform to support the groups more efficiently.

Features

One embodiment of a computer-implemented method may include enabling, via a first user interface, a group payment vehicle creator to self-establish a group payment vehicle configured to make a proxy payment to at least one merchant. The proxy payment may include making a payment for, and with the authority of, the accepted group members to pay the merchant(s). The group payment vehicle creator may be enabled, via the first user interface, to (i) establish a payment mechanism with the group payment vehicle, and (ii) selectably invite multiple potential group members at respective network addresses. An electronic invitation may be communicated to each of the invited potential group members to participate in an event using the respective network addresses, where the electronic invitation may include information associated with the group payment vehicle. In response to at least one potential group member accepting the electronic invitation via a second user interface, The accepted group member(s) may be enabled to establish a respective payment mechanism with the group payment vehicle via the second user interface. The second user interface may be on a mobile app, website, text messaging, or otherwise. A data object inclusive of information associated with each of the accepted group member(s) who established respective payment mechanisms with the group payment vehicle may be formed. The data object may include the network address of the respective accepted group member(s) and coordinates of the respective payment mechanism(s), thereby logically connecting the respective payment mechanisms to the group payment vehicle.

The data object may be any data structure, such as within a database, data structure in a non-transitory memory, centralized data storage device, distributed data storage locations (e.g., blockchain), or otherwise. The data object may include multiple data objects in which a data structure is used to store information associated with the group payment vehicle originator, potential group payment vehicle members, and accepted group payment vehicle members. Thereafter, the objects may be dynamically updated as event planning and actual event activities, including paying vendors, occur. The group payment vehicle creator may be notified that the group payment vehicle is established and available for usage in paying the merchant(s). Thereafter, the group payment vehicle creator may be able to manage the data in the data objects for the event and each of the accepted group members may be able to manage their own data (e.g., update payment mechanism) prior to, during, or after the event.

The process may further be configured to automatically send a final confirmation of acceptance to each of the accepted group member(s) prior to enabling the creator of the group payment vehicle to pay the merchant(s), and, in response to receiving acceptance confirmation from the accepted group member(s), enable the group payment vehicle creator of the group payment vehicle to pay the merchant(s) using the group payment vehicle. The group payment vehicle creator of the group vehicle payment may be enabled to select whether the group payment vehicle is a debit-type or credit-type of group payment vehicle. In an embodiment, the selection may be performed via the first user interface.

In response to the group payment vehicle creator of the group vehicle payment selecting for the group payment vehicle to be a debit-type group payment vehicle, each of the respective accepted member(s) may be required to accept terms and make payment prior to enabling the group payment vehicle creator (or someone else given authority) to pay the merchant(s) using the group payment vehicle. In response to receiving payment from each of the accepted group member(s) prior to the event, a notice may be sent to the group payment vehicle creator. In response to all of the accepted group member(s) paying prior to the event, the group payment vehicle creator may be enabled to pay the at least one merchant using the debit-type group payment vehicle. If one or more of the accepted group member(s) have not made payment for whatever reason, the group payment vehicle creator may adjust balances of the remaining accepted group member(s) to meet a total balance to be paid or may make any other adjustment that satisfies payment to the merchant(s). The data object may be updated to be indicative of the payment (e.g., adjusting payment amounts for each of the accepted group members). A notification of the payment of the merchant(s) may be communicated to each of the accepted group member(s) who made payment.

In response to at least one of the accepted group member(s) failing to make payment to the debit-type group payment vehicle, the group payment vehicle creator may be enabled to remove the at least one of the accepted group member(s) who failed to make payment. A difference in amount of money removal of the at least one of the accepted group member(s) who failed to pay will be to each of the remaining accepted group member(s) may be calculated. A query may be communicated to each of the other accepted group member(s) who made payment to the debit-type group payment vehicle as to whether or not the other accepted group member(s) who made payment whether he or she is willing to remain as an accepted group member and pay the difference in amount of money utilizing information stored in the data object. Responsive to each of the remaining accepted group member(s) agreeing the remain an accepted group member, an updated payment due message may be communicated thereto.

Each of the respective accepted group member(s) may be enabled to accept payment terms includes presenting payment terms to each of the respective accepted group member(s). The payment terms may include (i) a percentage of a total balance to be applied to the group payment vehicle by each of the accepted group member(s), or (ii) a specific amount for each of the respective accepted group member(s) to apply to the group payment vehicle.

In an embodiment, a total amount committed to be applied to the group payment vehicle from the accepted group member(s) may be calculated and displayed for view by each of the potential and accepted group member(s) of the group payment vehicle. A list of the potential and accepted group member(s) may be displayed for each of the potential and accepted group member(s) to view.

In response to the group payment vehicle creator selecting for the group payment vehicle to be a credit-type group payment vehicle, payment may be automatically drawn from each of the respective payment mechanisms of the accepted group member(s) in response to the merchant(s) being paid with the group payment vehicle. The group payment vehicle creator of the group vehicle payment may be enabled to establish terms for the potential group members for participation with the group payment vehicle. The terms may be displayed for each of the potential group members for acceptance by the potential group members. The terms may be displayed on the second user interface. The selectable terms may be provided for the group payment vehicle creator of the payment group to select for each of the potential group members. The selectable terms may be enabled to be altered by the group vehicle payment creator, the potential group members, the accepted group member(s). The group vehicle creator may be enabled to approve of the altered selectable terms.

The group payment vehicle may automatically be disabled after payment of all of the merchant(s) of the event if the group payment vehicle is a debit-type of group payment vehicle. Alternatively, the group payment vehicle may automatically be disabled after payment by each of the group members after the event if the group payment vehicle is a credit-type of group payment vehicle.

A determination of a geographic location of the group payment vehicle creator of the group payment vehicle may be made, and, in response to determining that the creator of the group payment vehicle is not in a geographic location of the event, the group payment vehicle may be automatically disabled. Otherwise, the group payment vehicle creator of the group payment vehicle may be enabled to pay the merchant(s). By limiting use of the group payment vehicle by the group payment vehicle creator based on location, time, or otherwise, fraud may be avoided. For example, the group payment vehicle creator may be prevented from using the group payment vehicle that is supposed to be used at an event in Las Vegas if the group payment vehicle creator is in Miami.

The group payment vehicle creator of the group payment vehicle may be enabled to select potential merchants for the event and prices associated therewith.

An invitation may be communicated to each of the invited potential group members may include communicating a link or mobile app notification. The group payment vehicle creator may be enabled to enter a start date and an end date of the event. A determination may be made after the end date of the event as to whether a balance remains on the group payment vehicle. In response to determining that a balance remains on the group payment vehicle, the balance may be automatically disbursed to each of the accepted group member(s) in proportion to payment made to the group payment vehicle. A notification may be provided to the group payment vehicle creator that the group member is unable to be added to the group payment vehicle if a payment mechanism of an accepted group member is not accepted. The group payment vehicle creator may be prompted to alter a payment amount of the potential group member that is unable to be added due to the payment mechanism not being accepted.

A payment to the merchant(s) may be performed using the group payment vehicle. Balances of each of the accepted group member(s) may be adjusted in response to payment to the merchant(s) being performed. Balances of each of the accepted group member(s) may be adjusted as a proportion of a total balance to be paid the accepted group member(s).

One embodiment of a system may include a non-transitory memory configured to store data. An input/output (I/O) unit may be configured to communicate data via a communications network. At least one processor may be in communication with the non-transitory memory and I/O unit, and be configured to execute instructions that, when executed by the at least one processor, cause the processor(s) to enable a group payment vehicle creator to self-establish a group payment vehicle configured to make a proxy payment to at least one merchant. The group payment vehicle creator may be enabled to (i) establish a payment mechanism with the group payment vehicle, and (ii) selectably invite a plurality of potential group members at respective network addresses. An electronic invitation may be communicated to each of the invited potential group members to participate in an event using the respective network addresses (e.g., mobile devices, telephone numbers, email addresses, etc.). The electronic invitation may include information associated with the group payment vehicle. In response to at least one potential group member accepting the electronic invitation, the accepted group member(s) may be enabled to establish a respective payment mechanism with the group payment vehicle via the second user interface. A data object inclusive of information associated with each of the accepted group member(s) who established respective payment mechanisms with the group payment vehicle may be formed in the non-transitory memory. The data object may include or store the network address of the at least one respective accepted group members and coordinates of the respective payment mechanisms, thereby logically connecting the respective payment mechanisms to the group payment vehicle. The group payment vehicle creator may be notified that the group payment vehicle is established and available for usage in paying the at least one merchant.

The instructions, when executed by the processor(s), may further be configured to automatically send a final confirmation of acceptance to each of the accepted group member(s) prior to enabling the creator of the group payment vehicle to pay the merchant(s). In response to receiving acceptance confirmation from at least one of the accepted group member(s), the group payment vehicle creator of the group payment vehicle may be enabled to pay the merchant(s) using the group payment vehicle.

The instructions, when executed by the at least one processor, may further be configured to enable the group payment vehicle creator of the group vehicle to select whether the group payment vehicle is a debit-type or credit-type of group payment vehicle. In response to the group payment vehicle creator of the group vehicle payment selecting for the group payment vehicle to be a debit-type group payment vehicle, each of the respective accepted group member(s) may be required to accept terms and make payment prior to enabling the group payment vehicle creator to pay the merchant(s) using the group payment vehicle.

The instructions, when executed by the at least one processor, may further be configured to, in response to receiving payment from each of the accepted group member(s) prior to the event, send a notice to the group payment vehicle creator. In response to all of the accepted group member(s) paying prior to the event, the group payment vehicle creator may be enabled to pay the merchant using the debit-type group payment vehicle. The data object indicative of the payment may be updated, and a notification of the payment of the merchant(s) may be communicated to each of the accepted group member(s) who made payment.

The instructions, when executed by the at least one processor, may further be configured to enable the group payment vehicle creator to remove at least one of the accepted group member(s) who failed to make payment to the debit-type group payment vehicle. A difference in amount of money that the accepted group member(s) who failed to pay is to be applied to each of the remaining at least one accepted group member. A communication, utilizing information stored in the data object, including a query to each of the other accepted group member(s) who made payment to the debit-type group payment vehicle is willing to remain as an accepted group member and pay the difference in amount of money. Responsive to each of the remaining accepted group member(s) agreeing the remain an accepted group member, communicate an updated payment due message thereto. Each of the respective accepted group member(s) may be enabled to accept payment terms may be presented payment terms, where the payment terms may include a percentage of a total balance to be applied to the group payment vehicle by each of the accepted group member(s), or a specific amount for each of the respective accepted group member(s) may be applied to the group payment vehicle.

The instructions, when executed by the at least one processor, may further be configured to calculate a total amount committed to be applied to the group payment vehicle from the accepted group member(s), and display the total amount committed for view by each of the potential and accepted group member(s) of the group payment vehicle. Moreover, a list of the potential and accepted group member(s) may be displayed for each of the potential and committed group members to view.

In response to the group payment vehicle creator selecting for the group payment vehicle to be a credit-type group payment vehicle, the processor may further be configured to automatically draw payment from each of the respective payment mechanisms of the accepted group member(s) in response to the merchant(s) being paid with the group payment vehicle.

The processor(s) may further be configured to enable the group payment vehicle creator of the group vehicle payment to establish terms for the potential group members for participation with the group payment vehicle, and display, for each of the potential group members, the terms for acceptance by the potential group members. Selectable terms may be provided for the group payment vehicle creator of the payment group vehicle to select for each of the potential group members. Such terms may include amounts to be paid by each respective potential group member for the event, location of the event, merchant(s) for the event, date(s) of the event, and so on. The selectable terms may be enabled to be altered by the group vehicle payment creator, the potential group members, and the accepted group member(s). The group vehicle creator may approve the altered terms.

The instructions, when executed by the at least one processor, may further be configured to automatically disable the group payment vehicle after payment of all of the merchant(s) of the event if the group payment vehicle is a debit-type of group payment vehicle. Alternatively, the group payment vehicle may automatically be disabled after payment by the accepted group member(s) after the event if the group payment vehicle is a credit-type of group payment vehicle.

The processor(s) may further be configured by the instructions to determine a geographic location of the group payment vehicle creator of the group payment vehicle, and, in response to determining that the creator of the group payment vehicle is not in a geographic location of the event, automatically disable the group payment vehicle. Otherwise, the group payment vehicle creator of the group payment vehicle may be enabled to pay the merchant(s).

The group payment vehicle creator of the group payment vehicle may be enabled to select potential merchants for the event and prices associated therewith. An invitation may include a communicating a link or mobile app notification. The group payment vehicle creator may be enabled to enter a start date and an end date of the event. In an embodiment, a determination may be made after the end date of the event as to whether a balance remains on the group payment vehicle. In response to determining that a balance remains on the group payment vehicle, an automatic disbursement of the balance to each of the accepted group member(s) may be made in proportion to payment made to the group payment vehicle.

The group payment vehicle creator may be notified that the group member is unable to be added to the group payment vehicle if a payment mechanism of an accepted group member is not accepted. The group payment vehicle creator may be prompted to alter a payment amount of the potential group member that is unable to be added due to the payment mechanism not being accepted. A payment may be performed to the merchant(s) using the group payment vehicle, and balances of each of the accepted group member(s) may be adjusted in response to payment to the merchant(s) being performed. Balances of each of the accepted group member(s) may be adjusted based on a proportion of a total balance to be paid by each of the accepted group member(s).

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of at least one embodiment for implementing the invention, and the scope of the invention should not necessarily be limited by this description. The scope of the present invention is instead defined by the following claims.

What is claimed is:

1. A computer-implemented method, comprising:
enabling, via a first user interface, a group payment vehicle creator to self-establish a group payment vehicle configured to make a proxy payment to at least one merchant;
in response to the group payment vehicle being self-established, forming a group payment vehicle data object associated with the group payment vehicle, the object configured to store information associated with the group payment vehicle creator and group payment vehicle, the group payment data object including at least one data field representative of at least one parameter including at least one of group payment vehicle creator ID, group payment vehicle type, event date, event time, event location, vendor information, geolocation of the group payment vehicle creator, and at least one fraud and safety protocol;
enabling, via the first user interface, the group payment vehicle creator to:
 (i) establish a payment mechanism with the group payment vehicle; and
 (ii) selectably invite a plurality of potential group members at respective network addresses;
enabling the group payment vehicle creator to populate the data object by setting the at least one parameter;
forming a group payment vehicle creator data object inclusive of information associated with the group payment vehicle creator and payment mechanism;
logically connecting the group payment vehicle creator data object with the group payment vehicle data object, thereby financially connecting the payment mechanism of the group payment vehicle creator with the group payment vehicle;
communicating an electronic invitation to each of the invited potential group members to participate in an event using the respective network addresses, the electronic invitation including information associated with the group payment vehicle;
in response to at least one potential group member accepting the electronic invitation via a second user interface, enabling the at least one accepted group member to establish a respective payment mechanism with the group payment vehicle via the second user interface;
forming at least one accepted group member data object inclusive of information associated with each of the at least one accepted group member who established respective payment mechanisms with the group payment vehicle, the at least one group member data object including the network address of the at least one respective accepted group members and coordinates of the respective payment mechanisms;
logically connecting the respective at least one accepted group member data object including the established respective payment mechanisms to the group payment vehicle data object, thereby financially connecting the respective payment mechanisms of the at least one accepted group member;
notifying the group payment vehicle creator that the group payment vehicle is established and available for usage in paying the at least one merchant;
in response to determining that a fraud or security protocol is being violated based on the at least one data field representative of the at least one parameter as populated by the group payment vehicle creator, generating a signal to disable the group payment vehicle, thereby preventing the group payment vehicle from being used;
otherwise, enabling the group payment vehicle creator to pay the at least one merchant using the group payment vehicle to satisfy an invoice from the at least one merchant;
automatically and in real-time collecting payment from each of the respective payment mechanisms of the group payment vehicle creator and the at least one accepted group member that are logically and financially connected to the group payment vehicle data object prior to or after payment of the at least one merchant by the group payment vehicle creator based on a type of group payment vehicle selectably established by the group payment vehicle creator and stored in the group payment vehicle data object, thereby causing a balance of the group payment vehicle to be respectively (i) funded prior to or (ii) satisfied after payment of the at least one merchant.

2. The method according to claim 1, further comprising:
automatically sending a final confirmation of acceptance to each of the at least one accepted group member prior to enabling the creator of the group payment vehicle to pay the at least one merchant; and in response to receiving acceptance confirmation from at least one of the accepted group members, enabling the group payment vehicle creator of the group payment vehicle to pay the at least one merchant using the group payment vehicle.

3. The method according to claim 1, further comprising;
enabling the group payment vehicle creator of the group vehicle payment to select whether the group payment vehicle is a debit-type or credit-type of group payment vehicle; and
storing the type of group payment vehicle in the group payment vehicle data object; and
in response to the group payment vehicle type being a debit-type, causing the payment mechanisms of the respective group payment vehicle creator and the at least one accepted group members that are logically and financially connected to the group payment vehicle to pay the group payment vehicle in response to the at least one accepted group member to establish a respective payment mechanism with the group payment vehicle via the second user interface.

4. The method according to claim 3, wherein in response to the group payment vehicle creator of the group vehicle payment selecting for the group payment vehicle to be a debit-type group payment vehicle, requiring each of the at least one respective accepted members to accept terms and payment be made prior to enabling the group payment vehicle creator to pay the at least one merchant using the group payment vehicle.

5. The method according to claim 4, further comprising:
wherein in response to receiving payment from each of the at least one accepted group member prior to the event, sending a notice to the group payment vehicle creator;
in response to all of the at least one accepted group member paying prior to the event, enabling the group payment vehicle creator to pay the at least one merchant using the debit-type group payment vehicle;
updating the group payment vehicle data object indicative of the payment; and
communicating a notification of the payment of the at least one merchant to each of the at least one accepted group member who made payment and that are logically and financially connected to the group payment vehicle via the respective data objects.

6. The method according to claim 5, further comprising:
in response to at least one of the at least one accepted group member failing to make payment to the debit-type group payment vehicle, enabling the group payment vehicle creator to remove the at least one of the at least one accepted group member who failed to make payment;
calculating a difference in amount of money removal of the at least one of the at least one accepted group member who failed to pay will be to each of the remaining at least one accepted group member;
communicating, utilizing information stored in the at least one accepted group member data object, a query to each of the other at least one accepted group member who made payment to the debit-type group payment vehicle as to whether or not the other at least one accepted group member who made payment whether he or she is willing to remain as an accepted group member and pay the difference in amount of money; and
responsive to each of the remaining at least one accepted group member agreeing the remain an accepted group member, communicate an updated payment due message thereto.

7. The method according to claim 4, wherein enabling each of the respective at least one accepted group member to accept payment terms includes presenting payment terms to each of the respective accepting members, wherein the payment terms include:
a percentage of a total balance to be applied to the group payment vehicle by each of the at least one accepted group member; or
a specific amount for each of the at least one respective accepted group members to apply to the group payment vehicle.

8. The method according to claim 4, further comprising:
calculating a total amount committed to be applied to the group payment vehicle from the at least one accepted group member; and
displaying, for view by each of the potential and at least one accepted group member of the group payment vehicle, the total amount committed.

9. The method according to claim 8, further comprising displaying a list of the potential and committed group members for each of the potential and committed group members to view.

10. The method occurred to claim 3, wherein in response to the group payment vehicle creator selecting for the group payment vehicle to be a credit-type group payment vehicle, automatically drawing payment from each of the respective payment mechanisms of the at least one accepted group member that are logically and financially connected to the group payment vehicle in response to the at least one merchant being paid with the group payment vehicle.

11. The method according to claim 3, further comprising:
enabling the group payment vehicle creator of the group vehicle payment to establish terms for the potential group members for participation with the group payment vehicle; and
displaying, for each of the potential group members, the terms for acceptance by the potential group members.

12. The method according to claim 11, further comprising:
providing selectable terms for the group payment vehicle creator to select for each of the potential group members;
enabling the selectable terms to be altered by the group vehicle payment creator, the potential group members, and the at least one accepted group member; and
enabling approval of the altered selectable terms by the group vehicle creator.

13. The method according to claim 1, further comprising:
determining, whether payment of all of the at least one merchant of the event have been made; and
automatically disabling the group payment vehicle after payment of all of the at least one merchant of the event if the group payment vehicle is a debit-type of group payment vehicle.

14. The method according to claim 1, further comprising automatically disabling the group payment vehicle after payment by each of the accepted group members after the event if the group payment vehicle is a credit-type of group payment vehicle.

15. The method according to claim 1, further comprising:
determining a geographic location of the group payment vehicle creator of the group payment vehicle; and in response to determining that the creator of the group payment vehicle is not in a geographic location of the event, automatically disabling the group payment vehicle, otherwise, enabling the group payment vehicle creator of the group payment vehicle to pay the at least one merchant using the group payment vehicle.

16. The method according to claim 1, further comprising enabling the group payment vehicle creator of the group payment vehicle to select potential merchants for the event and prices associated therewith in advance of the event.

17. The method according to claim 16, further comprising automatically disabling the group payment vehicle after closing time of the at least one merchant.

18. The method according to claim 1, wherein communicating an invitation to each of the invited potential group members includes communicating a link or mobile app notification.

19. The method according to claim 1, further comprising enabling the group payment vehicle creator to enter a start date and an end date of the event.

20. The method according to claim 19, further comprising:
    determining, after the end date of the event, whether a balance remains on the group payment vehicle; and
    in response to determining that a balance remains on the group payment vehicle, automatically disbursing the balance to each of the at least one accepted group member in proportion to payment made to the group payment vehicle.

21. The method according to claim 1, further comprising notifying the group payment vehicle creator that the group member is unable to be added to the group payment vehicle if a payment mechanism of an accepted group member is not accepted.

22. The method according to claim 21, further comprising prompting the group payment vehicle creator to alter a payment amount of the potential group member that is unable to be added due to the payment mechanism not being accepted.

23. The method according to claim 1, further comprising:
    performing a payment to the at least one merchant using the group payment vehicle; and
    adjusting balances of each of the at least one accepted group member in response to payment to the at least one merchant being performed.

24. The method according to claim 23, wherein adjusting balances of each of the at least one accepted group member includes adjusting balances of each of the at least one accepted group member as a proportion of a total balance to be paid by the at least one accepted group member.

25. The method according to claim 1, wherein logically connecting the group payment vehicle creator data object and the at least one accepted group member data object results in the group payment vehicle creator and the at least one accepted group member being jointly and severably liable to the at least one merchant for payment by the group payment vehicle.

* * * * *